US012641425B2

(12) United States Patent
Singh et al.

(10) Patent No.: US 12,641,425 B2
(45) Date of Patent: May 26, 2026

(54) REAL-TIME DATA MANAGEMENT AND INTEGRITY ASSURANCE FOR ARTIFICIAL INTELLIGENCE-DRIVEN MILLIMETER WAVE ADVANCED METASURFACES

(71) Applicant: Dell Products L.P., Round Rock, TX (US)

(72) Inventors: Tejinder Singh, Manotick (CA); Sheng Sun, Kanata (CA); Raja Neogi, Portland, OR (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 18/656,407

(22) Filed: May 6, 2024

(65) Prior Publication Data

US 2026/0010588 A1     Jan. 8, 2026

(51) Int. Cl.
H04W 12/08 (2021.01)
*G06F 21/60* (2013.01)
*H04L 9/40* (2022.01)

(52) U.S. Cl.
CPC ............. *H04W 12/08* (2013.01); *G06F 21/60* (2013.01); *H04L 63/10* (2013.01)

(58) Field of Classification Search
CPC ......... H04W 12/08; G06F 21/60; H04L 63/10
See application file for complete search history.

(56) References Cited

U.S. PATENT DOCUMENTS 10,211,532 B2    2/2019   Foo
10,770,790 B1    9/2020   Mahanfar
(Continued)

FOREIGN PATENT DOCUMENTS

CN        117768269 A      3/2024

OTHER PUBLICATIONS qorvo.com, "CMD262 26-28 GHz (Ka Band) GaN Power Amplifier", Rev-A, URL-https://www.qorvo.com/products/p/CMD262, Jun. 14, 2022, 1 page.

(Continued)

*Primary Examiner* — David J Pearson
(74) *Attorney, Agent, or Firm* — Amin, Turocy & Watson, LLP

(57)     ABSTRACT
The technology described herein is directed towards rights management and integrity assurance of data for reconfigurable intelligent surfaces (metasurfaces), such as quality of experience data metrics and tile controller configuration data for configuring metasurfaces, including configurations based on artificial intelligence. Incoming signals impinging on the metasurface corresponding to rights-managed data are reflected by the metasurface as distorted signals, while authentication for access to this data is pending. An identity and access management system can be used for authentication. If access is granted, the metasurface is controlled to transmit non-distorted signals to the authenticated receiver. If access is denied, the metasurface is controlled to absorb the incoming signals. Further, information related to rights-managed data access can be recorded as a transaction in a decentralized block chain network. Path integrity to detect potential eavesdroppers can be performed, such as based on artificial intelligence generative adversarial network models.

20 Claims, 15 Drawing Sheets

(56) References Cited

U.S. PATENT DOCUMENTS

| | | | |
|---|---|---|---|
| 10,931,004 | B2 | 2/2021 | Yoo et al. |
| 11,329,375 | B1 | 5/2022 | West et al. |
| 11,855,745 | B2 | 12/2023 | Schloemer |
| 12,519,509 | B2 | 1/2026 | Zuo et al. |
| 2016/0112117 | A1 | 4/2016 | Platzer et al. |
| 2019/0334228 | A1 | 10/2019 | Haridas et al. |
| 2021/0013619 | A1 | 1/2021 | Alkhateeb et al. |
| 2022/0026524 | A1 | 1/2022 | Maruyama et al. |
| 2022/0231411 | A1 | 7/2022 | Lin |
| 2023/0101393 | A1* | 3/2023 | Dai ........................ H04W 72/23 726/6 |
| 2023/0142735 | A1 | 5/2023 | Raghavan et al. |
| 2023/0188170 | A1* | 6/2023 | Dutta .................... H04W 24/08 375/346 |
| 2023/0319507 | A1* | 10/2023 | Gummadi ............. G01S 5/0009 455/456.1 |
| 2024/0014862 | A1 | 1/2024 | Duan et al. |
| 2024/0364019 | A1 | 10/2024 | Hussain |
| 2024/0378930 | A1* | 11/2024 | Motos ................ G07C 9/00309 |
| 2024/0429969 | A1 | 12/2024 | Hong et al. |
| 2025/0062529 | A1 | 2/2025 | Nathan et al. |
| 2025/0125525 | A1 | 4/2025 | Rossanese et al. |
| 2025/0175217 | A1 | 5/2025 | Albanese et al. |
| 2025/0274165 | A1 | 8/2025 | Manolakos et al. |
| 2026/0046613 | A1* | 2/2026 | Elshafie .................. H04L 63/04 |

OTHER PUBLICATIONS

Ndjiongue et al., "Re-Configurable Intelligent Surface-Based VLC Receivers Using Tunable Liquid-Crystals: The Concept", Journal of Lightwave Technology, vol. 39, No. 10, May 15, 2021, pp. 3193-3200.

Long et al., "Active Reconfigurable Intelligent Surface Aided Wireless Communications", IEEE Transactions on Wireless Communications, vol. 20, No. 8, Aug. 2021, pp. 4962-4975.

Hu et al., "Design of a Novel 2-bit Wideband Beam-Scanning Reconfigurable Intelligent Surface", IEEE International Workshop on Electromagnetics: Applications and Student Innovation Competition, 2021, pp. 1-3.

Gros et al., "A Reconfigurable Intelligent Surface at mmWave Based on a Binary Phase Tunable Metasurface", IEEE Open Journal of the Communications Society, vol. 2, 2021, pp. 1055-1064.

Sievenpiper et al., "Two-dimensional Beam Steering Using an Electrically Tunable Impedance Surface", IEEE Transactions on Antennas and Propagation, vol. 51, No. 10, Oct. 2003, pp. 2713-2722.

Guclu et al., "Proof of Concept of a Dual-band Circularly-polarized Rf Mems Beam-switching Reflectarray", IEEE Transactions on Antennas and Propagation, vol. 60, No. 11, Nov. 2012, pp. 5451-5455.

Meng et al., "The Design and Analysis of Electronically Reconfigurable Liquid Crystal-Based Reflectarray Metasurface for 6G Beamforming, Beamsteering, and Beamsplitting", IEEE Access, vol. 4, 2016, 12 pages.

Ojaroudi et al., "Graphene-Based Reconfigurable Intelligent Meta-Surface Structure for THz Communications", 15th European Conference on Antennas and Propagation, 2021, 5 pages.

Tasci et al., "A New RIS Architecture With a Single Power Amplifier: Energy Efficiency and Error Performance Analysis", IEEE Access, Apr. 2022, 11 pages.

Bai et al., "RIS-Assisted Green Secure Communications: Active RIS or Passive RIS?", IEEE Wireless Communications Letters, Dec. 6, 2022, 5 pages.

Goldman et al., "SpaceX and T-mobile Focus on Direct Satellite-to-Smartphone to Improve Mobile Coverage in Remote Areas", Analysys Mason, Aug. 2022, 5 pages.

Jewett, Rachel, "How Big is the Satellite Industry's Direct-to-Device Opportunity?", Via Satellite, Sep. 12, 2023, Url-https://www.

satellitetoday.com/connectivity/2023/09/12/how-big-is-the-satellite-industrys-direct-to-device-opportunity/, Retrieved from the internet Dec. 2, 2024, 4 pages.

"Electromagnetic Metasurface", Wikipedia, URL-https://en.wikipedia.org/wiki/Electromagnetic_metasurface#, Retrieved from the internet Dec. 2, 2024, 9 pages.

Schweber, Bill., "The Doppler Effect: From Highly Ridiculed to Absolutely Indispensable, Part 1", Electrical Engineering News and Products, Apr. 19, 2022, URL-https://www.eeworldonline.com/the-doppler-effect-from-highly-ridiculed-to-absolutely-indispensable-part-1/, Retrieved from the internet Dec. 2, 2024, 14 pages.

"Doppler Effect", Wikipedia, URL-https://en.wikipedia.org/wiki/Doppler_effect, Retrieved from the internet Dec. 2, 2024, 8 pages.

Long et al., "A Promising Technology for 6G Wireless Networks: Intelligent Reflecting Surface", Journal of Communications and Information Networks, vol. 6, No. 1, Mar. 2021, 16 pages.

Singh et al., "Recent Advancements in Reconfigurable mmWave Devices Based on Phase-Change and Metal Insulator Transition Materials", IEEE Journal of Microwaves, vol. 3, No. 2, Apr. 2023, pp. 827-851.

Rodrigues et al., "Efficient Power Allocation Strategies in Hybrid Active-Passive Reconfigurable Intelligent Surfaces", IEEE Communications Letters, vol. 28, No. 1, Jan. 2024, pp. 113-117.

Rodrigues et al., "Optimized Phase Shifts in Intelligent Reflective Surfaces for Robust Radar-based Indoor Coverage Enhancement", Proceedings of the SPIE, Radar Sensor Technology XXVII, vol. 12535, 2023. pp. 64-76.

3GPP TR 23.737 V17.0.0, "3rd Generation Partnership Project; Technical Specification Group Services and System Aspects; Study on architecture aspects for using satellite access in 5G, (Release 17)", Dec. 2019, 82 pages.

3GPP TR 28.808 V17.0.0, "3rd Generation Partnership Project; Technical Specification Group Services and System Aspects Study on Management and Orchestration Aspects of Integrated Satellite Components in a 5G Network, (Release 17)", Mar. 2021, 30 pages.

3GPP TS 38.108 V17.0.0, 3rd Generation Partnership Project; Technical Specification Group Radio Access Network; NR; Satellite Access Node radio transmission and reception, (Release 17), Jun. 2022, 58 pages.

"DVB", Wikipedia, URL-https://en.wikipedia.org/wiki/DVB, Retrieved from the internet Dec. 2, 2024, 12 pages.

"DVB-S", Wikipedia, URL-https://en.wikipedia.org/wiki/DVB-S, Retrieved from the internet Dec. 2, 2024, 2 pages.

"DVB-S2", Wikipedia, URL-https://en.wikipedia.org/wiki/DVB-S2, Retrieved from the internet Dec. 2, 2024, 7 pages.

"DVB-S2X", Wikipedia, URL-https://en.wikipedia.org/wiki/DVB-S2X, Retrieved from the internet Dec. 2, 2024, 2 pages.

The Ad Hoc Group., "White Paper on the use of DVB-S2X for DTH Applications, DSNG & Professional Services, Broadband Interactive Services and VL-SNR applications", Digital Video Broadcasting, Mar. 2015, 16 pages.

DVB Org., "Implementation Guidelines for the Second Generation System for Broadcasting, Interactive Services, News Gathering and Other Broadband Satellite Applications; Part 2: S2 Extensions (DVB-S2X)", ETSI TR 102 376-2 V1.2.1, Jan. 2021, 212 pages.

DVB Org., "Second Generation Framing Structure, Channel Coding and Modulation Systems for Broadcasting, Interactive Services, News Gathering and Other Broadband Satellite Applications; Part 2: DVB-S2 Extensions (DVB-S2X)", DVB Document A083-2 Rev.4, Feb. 2024, 166 pages.

"Facts and Figures 2022—Mobile Network Coverage 2022", ITU, URL-https://www.itu.int/itu-d/reports/statistics/2022/11/24/ff22-mobile-network-coverage/, Retrieved from the internet Dec. 2, 2024, 4 pages.

Kenfack et al., "Modeling of a DVB-S2 Transmission Chain with Optimization of Adjustment Parameters for a Good Quality of the Reception Signal", International Journal of Communications, Network and System Sciences, vol. 16, Jan. 31, 2023, pp. 1-20.

ETSI EN 300 421 V1.1.2, "Digital Video Broadcasting (DVB); Framing Structure, Channel Coding and Modulation for 11/12 Ghz Satellite Services", Aug. 1997, 24 pages.

ETSI EN 302 307-1 V1.4.1, "Digital Video Broadcasting (DVB); Second Generation Framing Structure, Channel Coding and Modu-

(56) References Cited

OTHER PUBLICATIONS lation Systems for Broadcasting, Interactive Services, News Gathering and Other Broadband Satellite Applications; Part 1: DVB-S2", Jul. 2014, 80 pages.

ETSI EN 302 307 V1.2.1, Digital Video Broadcasting (DVB); Second Generation Framing Structure, Channel Coding and Modulation Systems for Broadcasting, Interactive Services, News Gathering and Other Broadband Satellite Applications (DVB-S2), Aug. 2009, 78 pages.

ETSI TR 102 376-1 V1.2.1, "Digital Video Broadcasting (DVB); Implementation Guidelines for the Second Generation System for Broadcasting, Interactive Services, News Gathering and other Broadband Satellite Applications; Part 1: DVB-S2", Nov. 2015, 118 pages.

ETSI TR 102 376-2 V1.2.1, "Digital Video Broadcasting (DVB); Implementation Guidelines for the Second Generation System for Broadcasting, Interactive Services, News Gathering and other Broadband Satellite Applications; Part 2: S2 Extensions (DVB-S2X)", Jan. 2021, 212 pages.

Lee et al., "Integrated DVB-X2 Receiver Architecture with Common Acceleration Engine", Applied Sciences, vol. 9, No. 3983, Sep. 23, 2019, 16 pages.

Nemer, Elias., "Physical Layer Impairments in DVB-S2 Receivers", Second IEEE Consumer Communications and Networking Conference, 2005, pp. 487-492.

DVB Org., "White Paper on the use of DVB-S2X for DTH applications, DSNG & Professional Services, Broadband Interactive Services and VL-SNR applications", DVB Document A172, Mar. 2015, 16 pages.

Babcock, Stephen., "AT&T Invested $450M in Maryland Network Upgrades Over 3 Years", Technical.ly, URL-https://technical.ly/startups/att-invested-450m-in-maryland-network-upgrades-over-3-years/, Jul. 9, 2019, Retrieved from the internet Dec. 2, 2024, 7 pages.

Tyree et al., "AT&T Providing Cell on Wheels to Help with Internet Connection at LU's Graduation", URL-https://wset.com/news/local/att-providing-cell-on-wheels-to-help-with-internet-connection-at-lus-graduation, May 10, 2017, Retrieved from the internet Dec. 2, 2024, 6 pages.

ITU, "H.222.0 : Information Technology-Generic Coding of Moving Pictures and Associated Audio Information: Systems", International Telecom Union, Aug. 2018, 306 pages.

Cioni et al., "DVB-S2X Physical Layer Performance Results Over Realistic Channel Models", International Journal of Satellite Communications and Networking, vol. 34, No. 3, Jul. 2015, 21 pages.

"MPEG Transport Stream", Wikipedia, URL-https://en.wikipedia.org/wiki/MPEG_transport_stream, Retrieved from the internet Dec. 2, 2024, 10 pages.

Keese, Col. John E., "Satellite Telemetry, Tracking and Control Subsystems", Massachusetts Institute of Technology, Oct. 29, 2003, 35 pages.

NASA, "State-of-the-Art of Small Spacecraft Technology", NASA 9.0 Communications, Feb. 12, 2024, 32 pages.

Stuhlfauth, Reiner. "5G NTN Takes Flight: Technical Overview of 5G Non-Terrestrial Networks", Rohde & Schwarz, White Paper, Version 01.00, 2022, 124 pages.

Dhaou, Riadh. "Modeling of Networks Composed of Satellite Constellations" University of Paris VI Dissertation, Nov. 8, 2002 [https://www.researchgate.netpublication/265231818_MODELING_OF_NETWORKS_COMPOSED_OF_SATELLITE_CONSTELLATIONS], 225 pages.

"Aerial SDK Layer 1" NVIDIA Docs Hub, https://docs.nvidia.com/aerial/archive/aerial-sdk/23-1/text/product_brief/aerial_sdk_layer_1.html] retrieved Jan. 16, 2025, 30 pages.

Notice of Allowance received for U.S. Appl. No. 18/609,134 dated Sep. 16, 2025, 11 pages.

Non-Final Office Action received for U.S. Appl. No. 18/656,441 dated Sep. 22, 2025, 7 pages.

Notice of Allowance received for U.S. Appl. No. 18/656,441 dated Nov. 19, 2025, 5 pages.

Notice of Allowance received for U.S. Appl. No. 18/739,880 dated Nov. 12, 2025, 10 pages.

Notice of Allowance received for U.S. Appl. No. 18/797,975 dated Sep. 19, 2025, 9 pages.

Healy, et al. "Layer-1 Physical Interface Transcoder Leveraging Metasurfaces" U.S. Appl. No. 18/899,886, filed Sep. 27, 2024, 63 pages.

Healy, et al. "Connecting Wi-Fi-Enabled Device to Non-Terrestrial Satellite Constellations" U.S. Appl. No. 18/899,909, filed Sep. 27, 2024, 55 pages.

Khaira, et al. "Layer-1 Physical Interface Transcoder With Signal Processing Capabilities to Support Hybrid Terrestrial and Non-Terrestrial Ground and Space Mesh Network" U.S. Appl. No. 18/902,052, filed Sep. 30, 2024,79 pages.

Healy, et al. "Universal Layer-1 Physical Interface Transcoder for Terrestrial and Non-Terrestrial Air-Interfaces" U.S. Appl. No. 18/899,739, filed Sep. 27, 2024, 62 pages.

Singh, et al. "Metasurface Integrated Non-Terrestrial Network Transcoder With Adaptive Slicing for Dynamic Allocation of Mesh Resources" U.S. Appl. No. 18/902,100, filed Sep. 30, 2024, 64 pages.

Singh, et al. "Edge Computing and Metasurfaces in Non-Terrestrial Network-Connected Transcoder Nodes" U.S. Appl. No. 18/902,158, filed Sep. 30, 2024, 66 pages.

Healy, et al. "High-Availability Communication Link That Supports Terrestrial and Non-Terrestrial Networks Including for Disaster-Relief and Emergency Management Services" U.S. Appl. No. 18/902,268, filed Sep. 30, 2024, 75 pages.

Singh, et al. "Allocating Primary and Secondary Metasurface Integrated Non-Terrestrial Network Transcoder Nodes" U.S. Appl. No. 18/902,360, filed Sep. 30, 2024, 64 pages.

Healy, et al. "Model-Controlled Layer-1 Physical Interface Transcoder to Support Hybrid Terrestrial and Non-Terrestrial Ground and Space Mesh Network" U.S. Appl. No. 18/899,504, filed Sep. 27, 2024, 64 pages.

Khaira, et al. "Enhancing Network Resiliency and Performance Through Multipath Routing With Metasurface-Integrated Portable Transcoder" U.S. Appl. No. 18/902,395, filed Sep. 30, 2024, 50 pages.

Singh, et al. "Secure Non-Terrestrial Network Links Utilizing Quantum Key Distribution Integrated Into a Metasurface Transcoder Node With Hardware Polarization Control" U.S. Appl. No. 18/902,422, filed Sep. 30, 2024, 37 pages.

Singh, et al. "Signal Correction Based on Environmental Factors in Metasurfaces for Non-Terrestrial Network Transcoder Nodes" U.S. Appl. No. 18/902,454, filed Sep. 30, 2024, 53 pages.

Khaira, et al. "Energy-Efficient Active Reconfigurable Intelligent Surface With Integrated Sub-Array Power Amplifiers and Signal Coupling" U.S. Appl. No. 18/586,838, filed Feb. 26, 2024, 33 pages.

Khaira, et al. "Energy-Efficient Active Reconfigurable Intelligent Surface With Selective Amplification" U.S. Appl. No. 18/609,134, filed Mar. 19, 2024, 39 pages.

Singh, et al. "Reconfigurable Intelligent Surface Integrated on Compact Drones for Wireless Network Survey" U.S. Appl. No. 18/913,434, filed Oct. 11, 2024, 36 pages.

Singh, et al. "Reconfigurable Intelligent Surfaces That Self Heal and Adapt By Altering the Tile Geometry" U.S. Appl. No. 18/656,431, filed May 6, 2024, 74 pages.

Singh, et al. "Predictive Signal Boosting in Distributed Tile Controllers for Reconfigurable Metasurfaces" U.S. Appl. No. 18/656,441, filed May 6, 2024, 54 pages.

Ye, et al. "Enhancing Non-Terrestrial Network Direct-To-Everything Service With Metasurfaces" U.S. Appl. No. 18/739,880, filed Jun. 11, 2024, 39 pages.

Singh, et al. "Metasurface Subarrays With Integrated Amplification and Tunable Delay for Estimating Angle of Arrival and Redirecting Wireless Signals" U.S. Appl. No. 18/750,710, filed Jun. 21, 2024, 41 pages.

Healy, et al. "Transcoding the Air-Interface Between Non-Terrestrial and Terrestrial Networks Leveraging Integrated Transcoder and Metasurface Mounted on a Drone" U.S. Appl. No. 18/780,254, filed Jul. 22, 2024, 61 pages.

(56) References Cited

OTHER PUBLICATIONS

Healy, et al. "Communication Between Non-Terrestrial and Terrestrial Networks Based on Layer-1 Physical Packet-Level Transcoding" U.S. Appl. No. 18/780,269, filed Jul. 22, 2024, 59 pages.

Singh, et al. "Reconfigurable Intelligent Surface With Variable Amplification and Attenuation Including Angle of Arrival Estimation of Wireless Signals" U.S. Appl. No. 18/797,975, filed Aug. 8, 2024, 46 pages.

Notice of Allowance mailed Mar. 10, 2026 for U.S. Appl. No. 18/902,100, 57 pages.

* cited by examiner

504

Tile Controller ~ 506

910

Software Defined Metasurface Agent

DRL(Search) + LLM(Anomalies) + GAN(Compute)

Synchronous Update
(+ Measurface AoD and/or ToF)

Asynchronous Update

Tile Controller Agent

\<Voltage\> = GAN (i, Amplitude, Phase, Delay)

<u>904</u>

Endpoint Agent

\<RSSI, SINR, AoA, AoD, ToF\> = GAN (Channel)

<u>906</u>

*Voltage / Delay Used for Fingerprinting Beam (ToF)*

*AoA, AoD, ToF for Path Verification*

FIG. 13 begin

Figure 13:
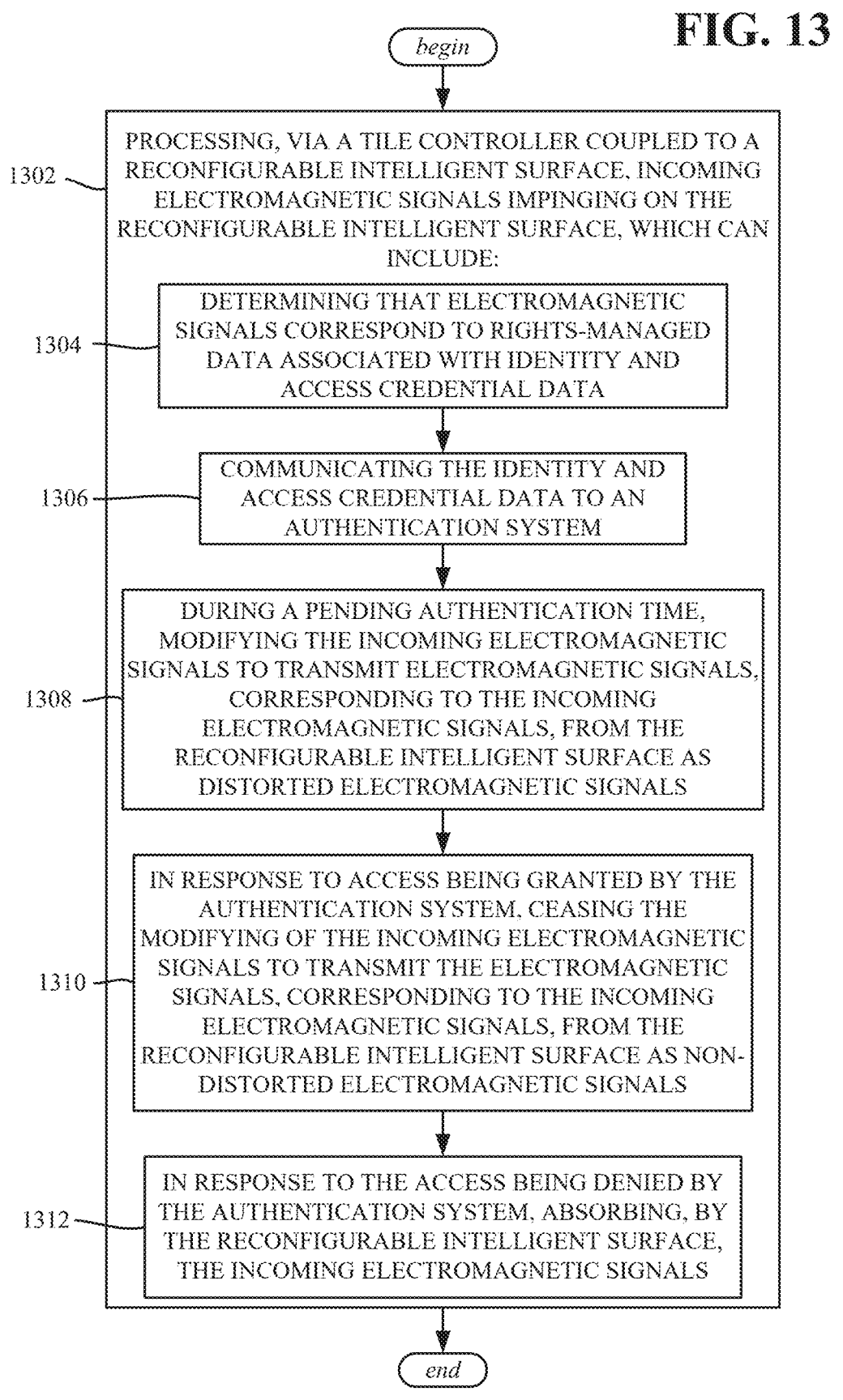

1302 — PROCESSING, VIA A TILE CONTROLLER COUPLED TO A RECONFIGURABLE INTELLIGENT SURFACE, INCOMING ELECTROMAGNETIC SIGNALS IMPINGING ON THE RECONFIGURABLE INTELLIGENT SURFACE, WHICH CAN INCLUDE:

1304 — DETERMINING THAT ELECTROMAGNETIC SIGNALS CORRESPOND TO RIGHTS-MANAGED DATA ASSOCIATED WITH IDENTITY AND ACCESS CREDENTIAL DATA

1306 — COMMUNICATING THE IDENTITY AND ACCESS CREDENTIAL DATA TO AN AUTHENTICATION SYSTEM

1308 — DURING A PENDING AUTHENTICATION TIME, MODIFYING THE INCOMING ELECTROMAGNETIC SIGNALS TO TRANSMIT ELECTROMAGNETIC SIGNALS, CORRESPONDING TO THE INCOMING ELECTROMAGNETIC SIGNALS, FROM THE RECONFIGURABLE INTELLIGENT SURFACE AS DISTORTED ELECTROMAGNETIC SIGNALS

1310 — IN RESPONSE TO ACCESS BEING GRANTED BY THE AUTHENTICATION SYSTEM, CEASING THE MODIFYING OF THE INCOMING ELECTROMAGNETIC SIGNALS TO TRANSMIT THE ELECTROMAGNETIC SIGNALS, CORRESPONDING TO THE INCOMING ELECTROMAGNETIC SIGNALS, FROM THE RECONFIGURABLE INTELLIGENT SURFACE AS NON-DISTORTED ELECTROMAGNETIC SIGNALS

1312 — IN RESPONSE TO THE ACCESS BEING DENIED BY THE AUTHENTICATION SYSTEM, ABSORBING, BY THE RECONFIGURABLE INTELLIGENT SURFACE, THE INCOMING ELECTROMAGNETIC SIGNALS end

REAL-TIME DATA MANAGEMENT AND INTEGRITY ASSURANCE FOR ARTIFICIAL INTELLIGENCE-DRIVEN MILLIMETER WAVE ADVANCED METASURFACES

BACKGROUND

Reconfigurable intelligent surfaces (alternatively referred to metasurfaces) are man-made thin reflective or refractive surfaces whose electromagnetic response can be electronically controlled. Reconfigurable intelligent surfaces are characterized by their two-dimensional arrays of electronically controllable reflecting elements that can dynamically manipulate electromagnetic waves by altering attributes such as phase, amplitude, and direction of the incoming signal.

Each metasurface typically is made up of (possibly up to) dozens, hundreds or thousands of unit-cells, and because the individual unit-cell can be controlled, reconfigurable intelligent surfaces can provide programmable and smart wireless environments. For example, one scenario is to use such a surface to intelligently reconfigure wireless communications. More particularly, objects in the path of a wireless signal, such as buildings and trees, can block wireless communication signals at higher frequencies, including millimeter-wave (mm-Wave) frequency bands (24.5 gigahertz, or GHz-52.6 GHz), and even higher. This can be overcome by installing a large number of base stations to provide coverage to otherwise blocked areas, but doing so would increase the infrastructure costs many times. Instead, a relatively inexpensive metasurface can be installed at various locations to reflect and/or refract higher frequency signals to otherwise blocked or weak coverage areas.

BRIEF DESCRIPTION OF THE DRAWINGS

The technology described herein is illustrated by way of example and not limited in the accompanying figures in which like reference numerals indicate similar elements and in which:

FIG. 13 is a flow diagram showing example operations related to transmitting distorted electromagnetic signals while authentication is pending, and transmitting non-distorted electromagnetic signals if authentication is granted or absorbing incoming electromagnetic signals if authentication is denied, in accordance with various example embodiments and implementations of the subject disclosure.

DETAILED DESCRIPTION

Figure 1:
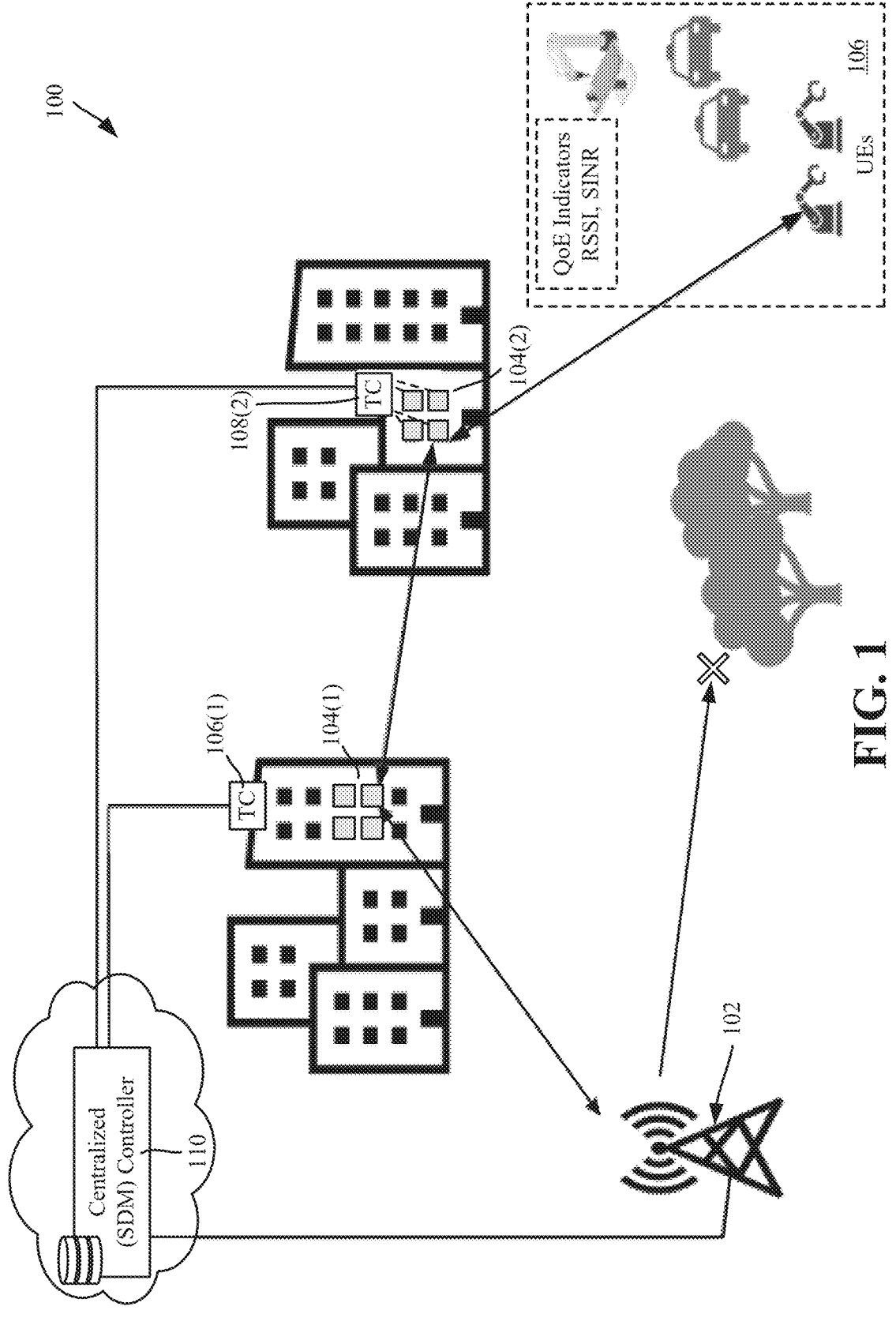
FIG. 1 is a representation of an example communications setup using reconfigurable intelligent surfaces in wireless communications paths, coupled to tile controllers configured for controlling access to rights-managed data, in accordance with various example embodiments and implementations of the subject disclosure.

The technology described herein is generally directed towards data management and integrity assurance for the various data related to reconfigurable intelligent surfaces (metasurfaces, engineered ultrathin structures), which in conjunction with controllers, can manipulate incoming signal interactions without manual intervention by controlling the characteristics (e.g., phase shifts) of a metasurface's unit cells. Reconfiguration of a metasurface can be on-demand, based on real time control with artificial intelligence/machine learning (AI/ML) models facilitating active devices.

In general, for incoming signals corresponding to rights-managed data, the metasurface/tile controller obtains authentication-related information (credential information) associated with access (storage read or write) to the rights-managed data. While authentication is pending, the meta-surface is controlled to transmit (reflect) distorted signals. If access is granted, the metasurface is controlled to transmit non-distorted signals to the authorized receiver. If access is denied, the metasurface is controlled to absorb the incoming signals, e.g., short them to RF (radio frequency) ground.

Further, data access information can be recorded as a transaction in a decentralized block chain network, which avoids a single point of failure and includes a smart-contract for programmable access control. An identity and access management (IAM) system can be used for authentication.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of a wireless communications environment including an example system 100 including a base station 102 that communicates downlink (DL) and uplink (UL) signal transmissions, via a reconfigurable intelligent surfaces 104(1) and 104(2), (depicted as gray squares in FIG. 1), with user equipment 106. In general, each of the reconfigurable intelligent surfaces 104(1) and 104(2), or metasurfaces, is a relatively large array of tunable elements that reflect incident waves with controllable phase and amplitude.

As shown in FIG. 1, consider that for millimeter wave frequencies, the reconfigurable intelligent surfaces 104(1) and 104(2) are needed to avoid an obstacle between the base station 102 and the user equipment 106. In general, milli-meter wave communication is blocked by many types of obstacles, whereby metasurface(s) can be used to avoid such obstacles that are between the transmitter and the receiver(s). As shown in FIG. 1, beams may bounce off multiple metasurfaces before reaching a receiver.

In the example system 100, each group of reconfigurable intelligent surfaces 104(1) and 104(2), e.g., deployed at a particular site (such as on or within a building), is coupled to a respective tile controller (TC) 108(1) and 108(2) for that site, e.g., by a synchronous link. The tile controllers 108(1) and 108(2) are coupled to a centralized controller 110, e.g., a cloud-hosted AI compute global controller, also referred to as a software-defined metasurface (SDM) controller. The metasurfaces also can leverage AI distributed across the tile controllers 108(1) and 108(2) and the centralized controller, e.g., the tile controllers 108(1) and 108(2) can be coupled to or incorporate trained AI models, including for outputting configuration data for reconfiguring their respective meta-surface(s) on demand.

Turning to rights-managed data, the edge cloud controller and tile controllers collect large amounts of data, and some assurance is needed for that data; there can be regulatory activity/rights management compliance needed, for example, and collecting and storing such data is likely to be standardized. Some amount of the data needs to be consumed and kept in the tile controllers, and some (e.g., macro data) at the centralized controller. Rights management of such metasurface-related data can ensure the accuracy, reliability, and security of the data and information processed by a reconfigurable metasurface's tile controller and the centralized controller.

Thus, the metasurface element configuration data and events such as performance metrics (quality of experience, or QoE) data obtained by the base station 102 need to be kept private. Along with the metasurface designer and metasurface user, the data owner and data consumer need to have a trust relationship, where the data owner trusts the data consumer to use the data and information in a responsible and ethical manner, and the data consumer trusts the data owner to provide data and information in a truthful and authentic manner. There also may be a data auditor that needs access to the data for regulatory compliance.

In general, real-time data management and integrity assurance for AI-driven metasurfaces can facilitate the optimization of intelligent metasurfaces with highly beneficial functionalities and performance. As such, rights management (trust and access rights) with respect to accessing tile controller and metasurface-related data is a significant consideration in deploying controlled metasurfaces. Such data thus needs access control to ensure that only authorized entities can access the data, and that the data be trusted. Note however that metasurface element configuration data is event driven, while real-time logs (e.g., for telemetry data/base station events) are synchronous.

Figure 2:
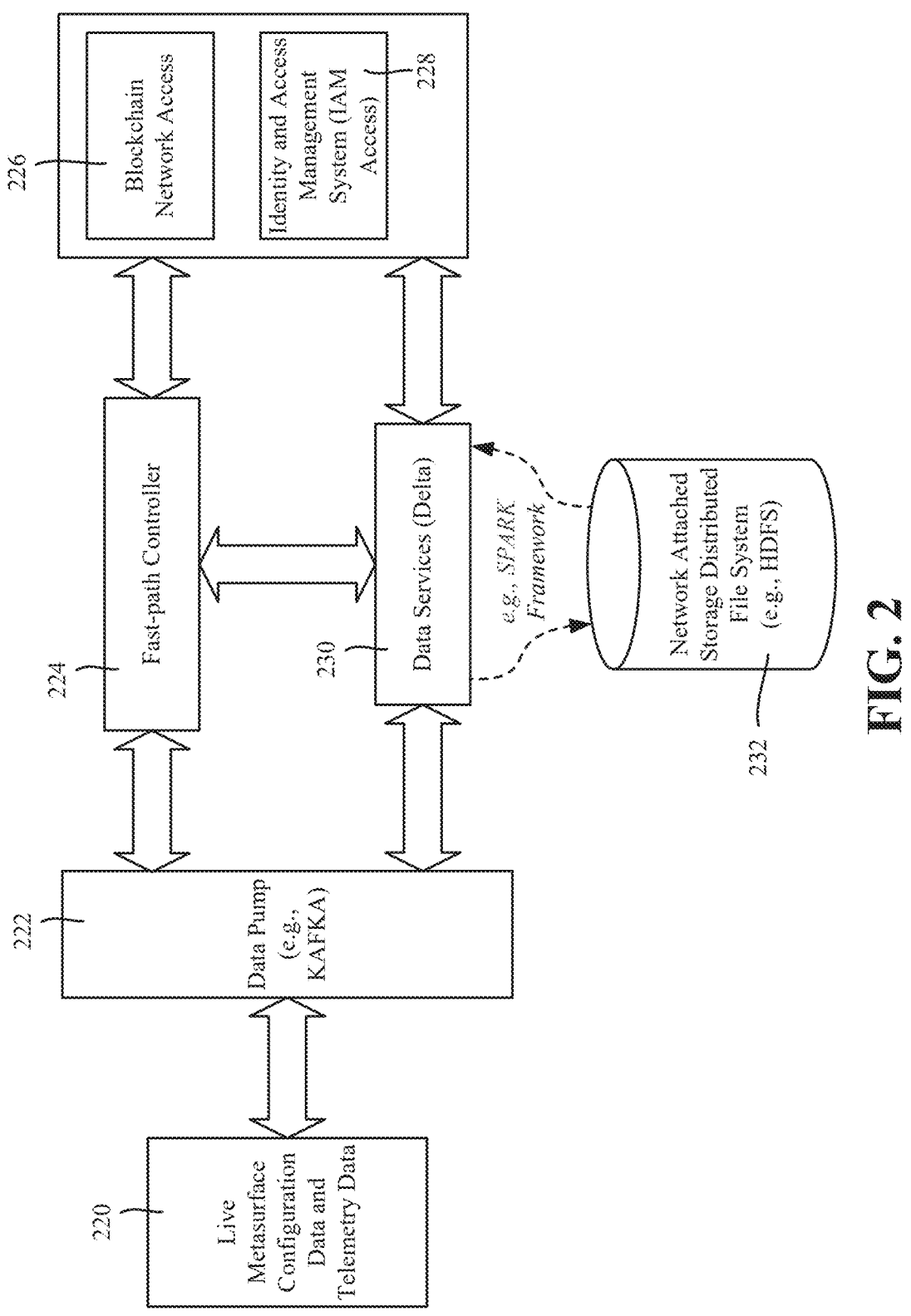
FIG. 2 is an example dataflow/block diagram with respect to storing and accessing rights-managed data related to a metasurface, in accordance with various example embodiments and implementations of the subject disclosure.

FIG. 2 shows one example implementation of blocks for storing rights-managed telemetry data (e.g., base station events) and rights-managed metasurface configuration data 220, e.g., as live data comes in via a data pump 222, e.g., via a message/event streaming platform such as KAFKA, (a cloud-based technology in which data message sequences are separated to allow access to producers and consumers and pumped as separate data into appropriate components). As used herein, the data associated with different tile controllers/metasurfaces and other telemetry data can be parked as structured or unstructured data in a data store/data system.

A controller 224 (e.g., a fast-path controller) provides the pumped data to a blockchain network (access system) 226, and to an identity and access management system 228 (IAM access). The data pump 222 also provides the rights-managed data to data services 230, for access-controlled storage and retrieval using a network attached storage distributed file system 232, (e.g., HDFS, or HADOOP distributed file system coupled to the data services 230 by a framework/engine such as SPARK). As will be understood, the data services 230 communicates with the identity and access management system 228 to obtain access grants to the rights-managed data, and also records transactions related to data access in the blockchain network 226.

Figure 3:
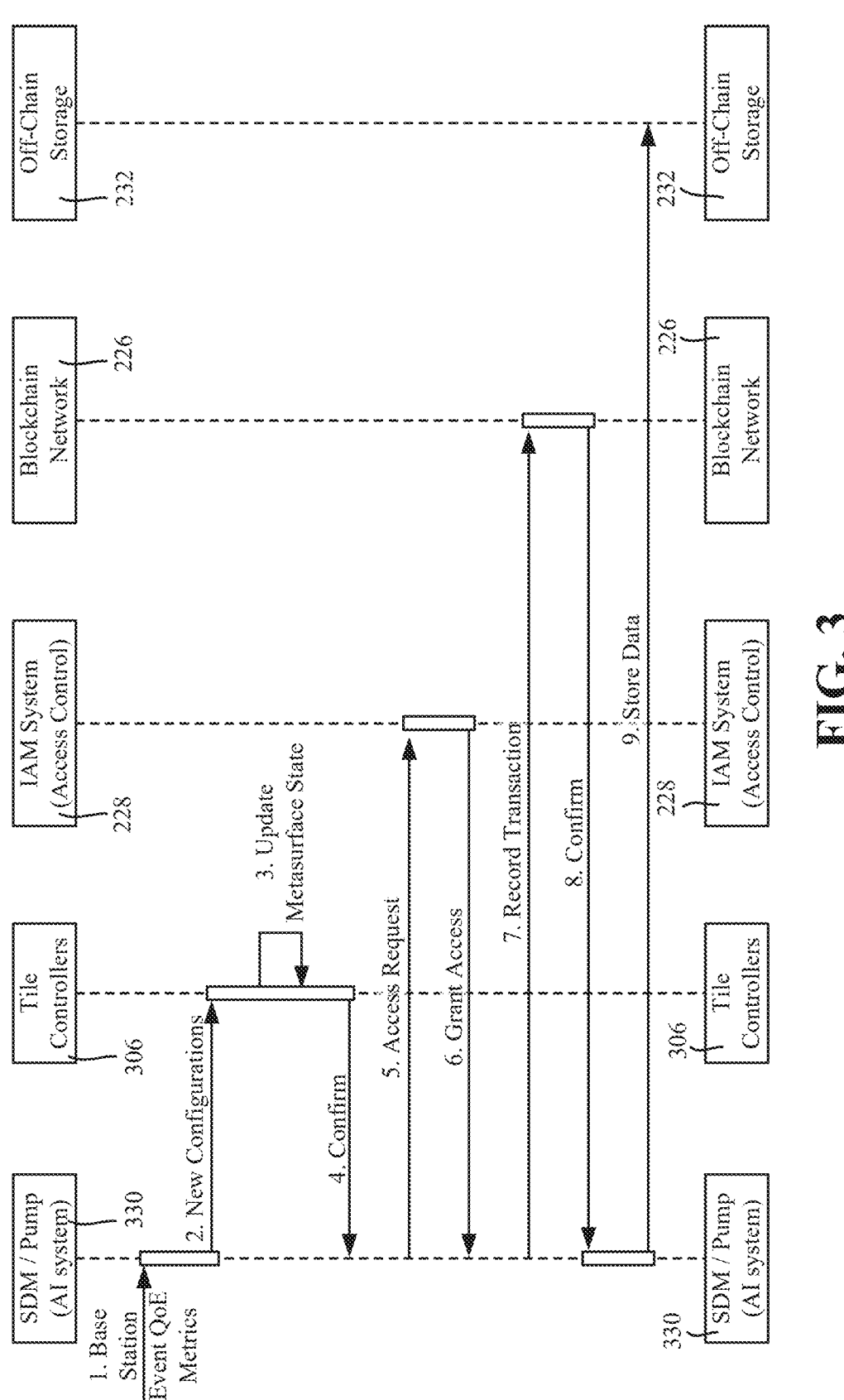
FIG. 3 is a representation of an example sequence/dataflow diagram of event logging of rights-managed event data related to a metasurface, in accordance with various example embodiments and implementations of the subject disclosure.

FIG. 3 represents an example dataflow sequence generally among the example components of FIG. 2 with respect to base station event logging, (in which the SDM (centralized controller/AI system) and data pump are collectively labeled 330). When a base station event, e.g., quality of experience (QoE) metrics data is obtained (arrow one (1)), new configurations for the metasurfaces may be provided (arrow two (2)) to the tile controllers 306. As represented by arrow three (3), the tile controllers 306 update their metasurfaces' states accordingly, e.g., change unit cell phases for beam direction, subarray aperture sizes for beam strength, and so on as specified in the new configuration data. Arrow four (4) represents the tile controllers confirming the update(s).

At arrow five (5), the centralized controller/data pump 330 (e.g., coupled to data services 230 of FIG. 2) makes an access request, related to the received event, to the IAM (identity and access management) access control system 228. In this example, access is granted, as represented by arrow six (6). Further, the centralized controller/data pump 330 records the transaction in the blockchain network 226 (with embedded smart contract) and receives a confirmation therefrom, as represented by arrows seven (7) and eight (8), respectively. The centralized controller/data pump 330 also stores the event data in off-chain storage (e.g., in an event log in the network attached storage distributed file system) 232, as represented by arrow nine (9).

Figure 4:
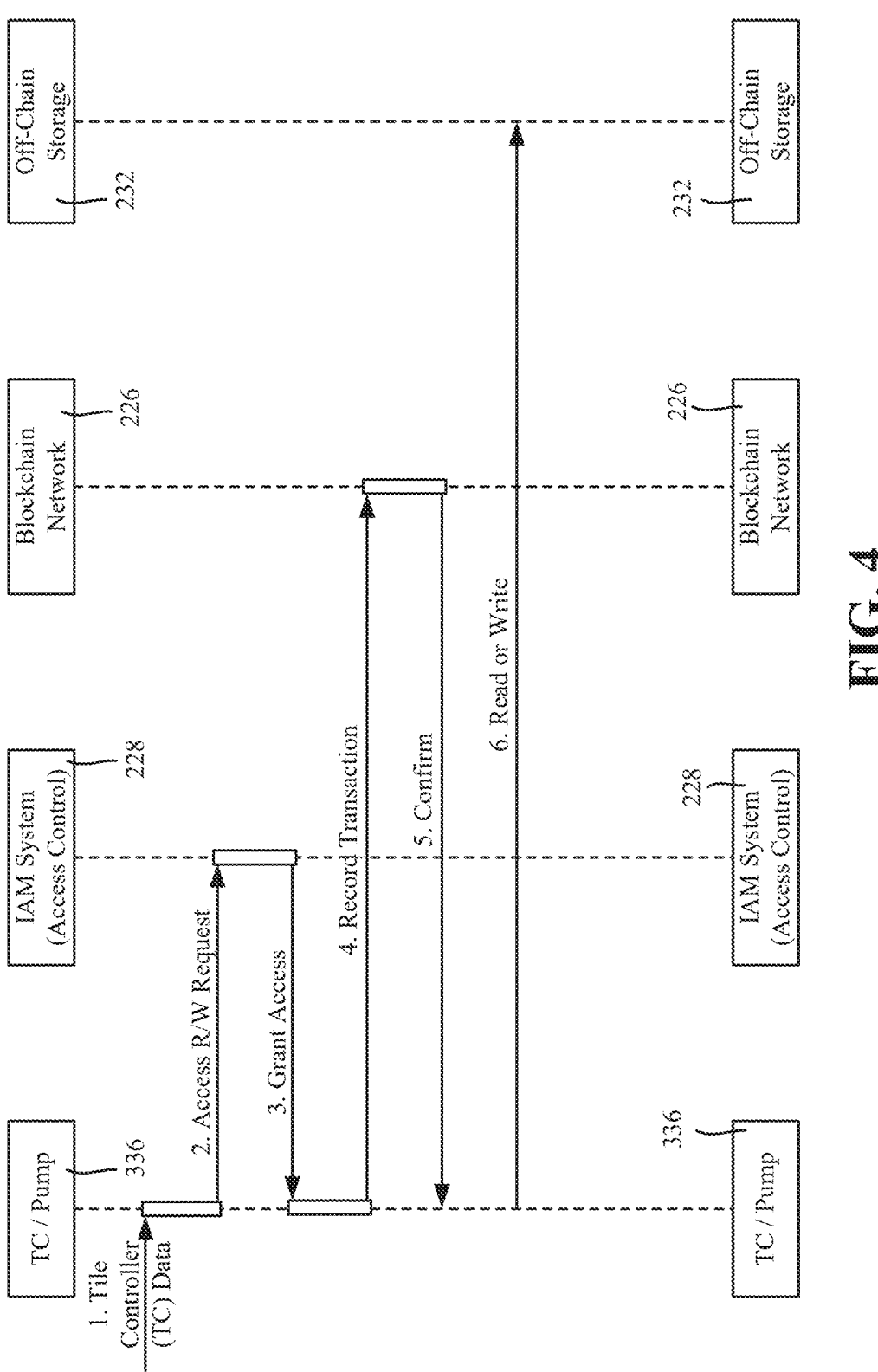
FIG. 4 is a representation of an example sequence/dataflow diagram of reading or writing of rights-managed structured tile controller data to (e.g., synchronous) tile controller logs, in accordance with various example embodiments and implementations of the subject disclosure.

FIG. 4 represents an example data flow and sequence among the example components of FIG. 3 with respect to reading and writing structured tile controller data, (in which the tile controller (TC) and data pump are collectively labeled 336). When tile controller data is to be read or written (arrow one (1)), the tile controller/data pump 336 (e.g., coupled to data services 230 of FIG. 2) makes an access request (arrow two (2)), related to the received event, to the IAM (identity and access management) access control system 228. In this example, access is granted, as represented by arrow three (3). Further, the tile controller/data pump 336 records the transaction in the blockchain network 226 (arrow four (4)) and receives a confirmation therefrom, as represented by arrow five (5). The tile controller/data pump 336 reads or writes the event data in the off-chain storage (e.g., in a synchronous tile controller log in the network attached storage distributed file system) 232, as represented by arrow six (6).

Figure 5:
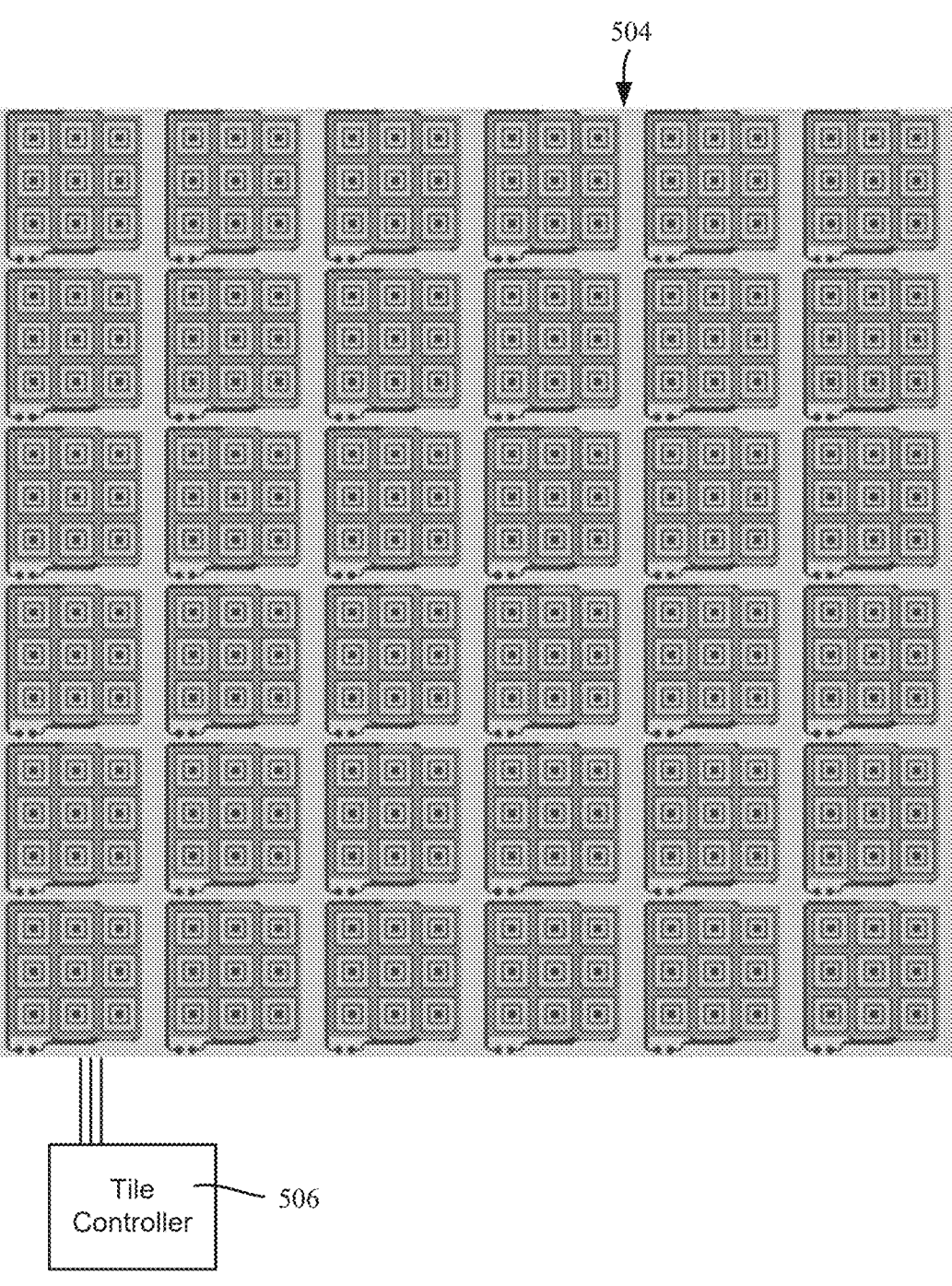
FIG. 5 is a representation of an example a reconfigurable intelligent surface coupled to a tile controller for access-controlled redirection of incoming electromagnetic signals, in accordance with various example embodiments and implementations of the subject disclosure.

Turning to reconfigurable intelligent surfaces in general, FIG. 5 shows a representation of an example implementation of a reconfigurable intelligent surface/metasurface 504 coupled to a tile controller 506 for access-controlled redirection of incoming electromagnetic signals as described herein. Reconfigurable intelligent surfaces are resistant to environmental changes; e.g., temperature, humidity, light, noise and the like generally do not lead to data distortions in metasurface designs.

Figure 6A:
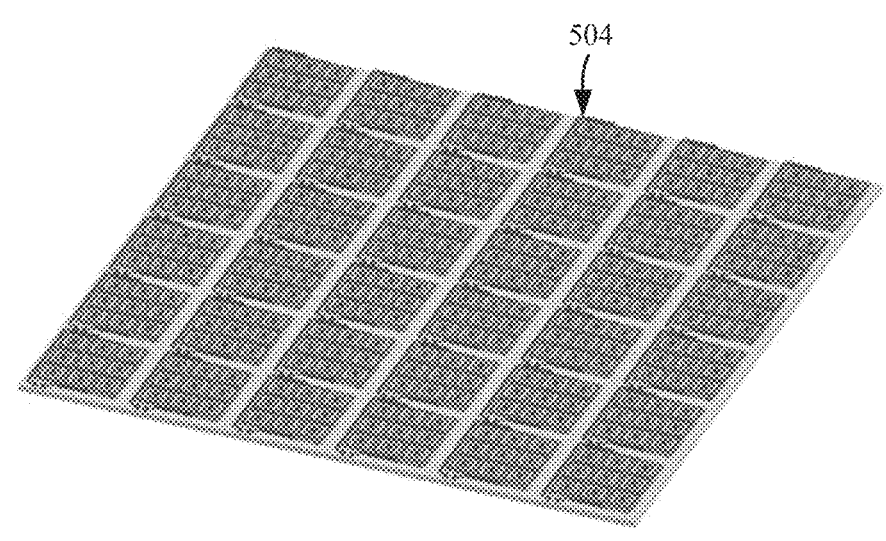
FIG. 6A is a three-dimensional perspective view representation of the example reconfigurable intelligent surface of FIG. 5, in accordance with various example embodiments and implementations of the subject disclosure.
Figure 6B:
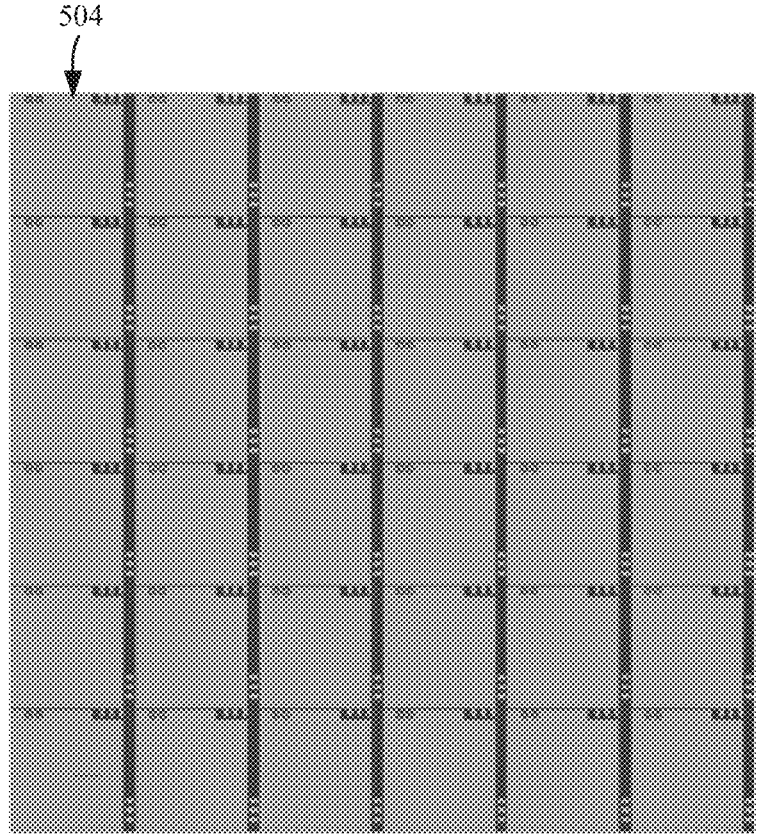
FIG. 6B is a bottom view representation of the example reconfigurable intelligent surface of FIG. 5, in accordance with various example embodiments and implementations of the subject disclosure.

In this non-limiting example, the metasurface has an array of 6×6 subarrays/modules, with each individual subarray having 3×3 modules of unit cells (a total of 18×18 unit-cell elements). Note that a metasurface can be configured with any practical number of m×n subarrays (typically m=n), and/or a subarray can have any practical number j×k of unit cells, (typically j=k). FIGS. 6A and 6B show a perspective view and a bottom view, respectively, of the reconfigurable intelligent surface/metasurface 504.

Figure 7:
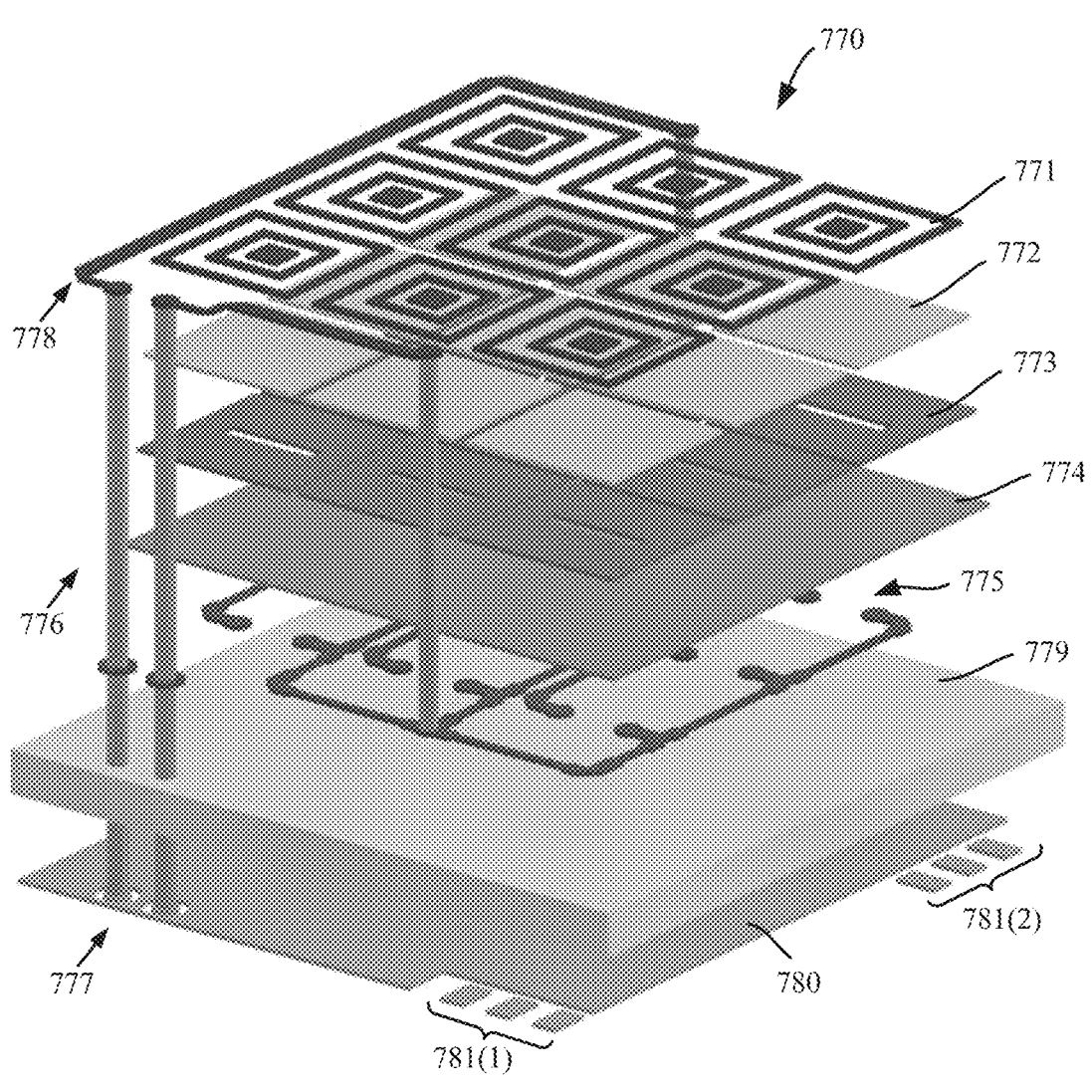
FIG. 7 is an exploded view representation of subarray of unit cells of a reconfigurable intelligent surface showing a stack of layers of the subarray, in accordance with various example embodiments and implementations of the subject disclosure.

FIG. 7 depicts one non-limiting example implementation of a subarray 770 of unit cells that includes a number of layers, which are represented as separated in this exploded, perspective view representation. Respective unit cells include electrically separated respective metallic resonating patterns (square shapes in this example, but of any suitable shape that can resonate at a desired, e.g., millimeter wave frequency), shown as resonators in a top layer 771.

The next layer down is a first dielectric layer 772, with a metallic slotted plane layer 773 beneath the first dielectric layer 772. Note that individual (e.g., 3×3) dielectric parts in the layer 772 per unit cell resonator is depicted in this upper dielectric layer 772, such as to facilitate separate fabrication of each unit cell; however such an upper dielectric layer alternatively can be implemented as a single dielectric layer.

The metallic slotted plane layer 773 includes openings that facilitate RF (radio frequency) partial signal coupling, through an RF transparent insulator/isolation layer 774, to a RF/EM circuit layer 775. In one example implementation, the incoming RF signals are coupled through the slots to a first metallic microstrip line having respective terminals aligned with (one portion of) the respective slots, in which the first metallic microstrip line combines the incoming RF signals from each unit cell resonator, and couples the combined RF signals to a second metallic microstrip line, sometimes after signal modification as described herein. The second microstrip line redistributes the combined signals, through respective terminals aligned with (another portion of) the respective slots, back to their respective unit cell resonators through interconnect couplings, resulting in reflected instances of the incoming signals. As shown in FIG. 7, the microstrip lines of the circuit layer 775 are coupled through vias/interconnects 776, including for signal send/return 777 (for possible modification) through a return path 778. In general, the lengths of the paths add sufficient delay so that the incoming RF signals do not interfere with the reflected RF signals.

The components above and including the circuit layer 775 are supported on a dielectric substrate 779. A metallic ground plane 780 is primarily beneath the dielectric substrate 779. Contact terminals 781(1) and 781(2) facilitate coupling of the subarray to the tile controller and other circuitry, including for signal modification (distortion) as described with reference to FIG. 8.

To summarize, in one example implementation, a layout of the subarrays (e.g., modular) enables the design to be scalable to larger reconfigurable intelligent surface dimensions. In one example implementation, the subarray of unit cells has layered and integrated components, including four metal layers, namely a resonating patterns layer, a slotted plane layer for signal coupling, a microstrip network for signal combining and dividing, and a ground plane with a reserved area of terminals for coupling the subarray to circuitry. Between every two metal layers, there is an intervening layer of dielectric material. Such an architecture thus includes a passive signal coupling mechanism for processing and absorption of incoming signals can accomplish this without needing an active electronic component per subarray, thus saving significant power and contributing to carbon neutral footprints.

Figure 8:
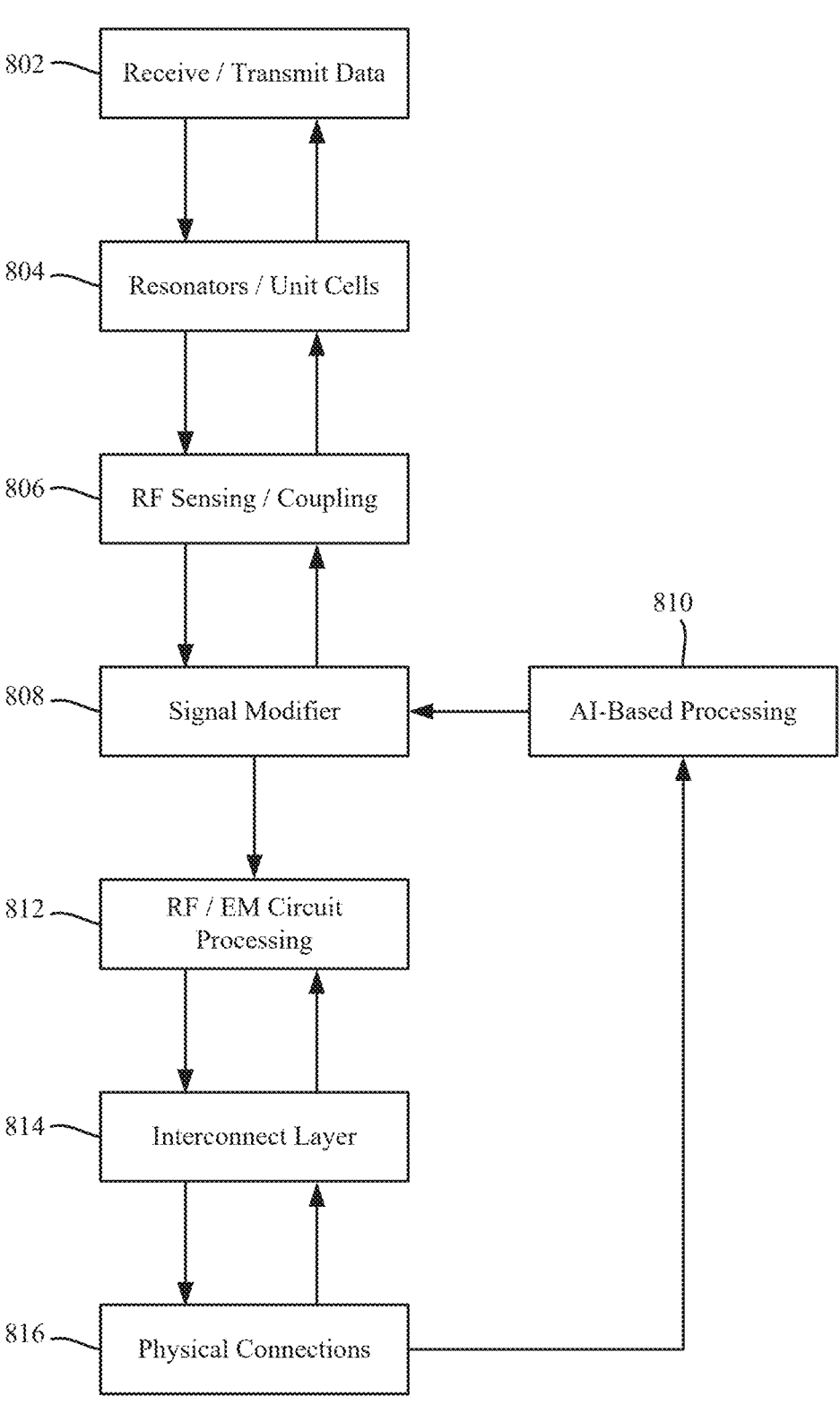
FIG. 8 is a block diagram representation of example components of subarrays of unit cells of a reconfigurable intelligent surface, in accordance with various example embodiments and implementations of the subject disclosure.

FIG. 8, block 802 represents the receiving and transmitting of the electromagnetic signals by the resonators/unit cells (block 804) of a metasurface. Block 806 represents the RF sensing/coupling through the signal coupling layer that includes the slots.

Blocks 808 and 810 represent signal modification, which is used to enforce rights management as described herein. In particular, RF energy incident on the panel and partial energy is coupled through the slot aperture coupling panel; this partial energy can be used for processing and authentication. While awaiting authentication (e.g., an access grant or denial) in response to an access request (as in FIGS. 3 and 4), signal modification (block 808), which can be AI-based (block 810), obtains the incoming signals through the signal send line 778, distorts the signals and returns the distorted signals through the signal send line 778 for reflection as distorted signals. Distortion can be accomplished by adding variable delay to the electromagnetic signals (e.g., by switching in and out combinations of capacitors coupled to the microstrip lines to vary the resultant signal delay over time), varying polarization of the electromagnetic signals, varying phase of the electromagnetic signals, varying amplitude of the electromagnetic signals and/or modifying other signal characteristics.

FIG. 8 also represents the RF/EM circuit processing (block 812), and the interconnect layer (block 814) to the physical connections (block 816), e.g., below the ground plane. In this way, while an access request is pending authentication, the reflected signals are intentionally modified/distorted so as to be unintelligible to the receiver.

Rights management as described herein can also be enhanced by verifying the integrity of the signal path/ensuring that the signal path is not compromised. For example, an eavesdropper can tap into the signal path (which can be detected via a drop in expected signal strength), or can redirect the signals with intervening metasurfaces or the like (which can be detected by a change in the signal's expected angle of arrival/expected time of flight).

Figure 9:
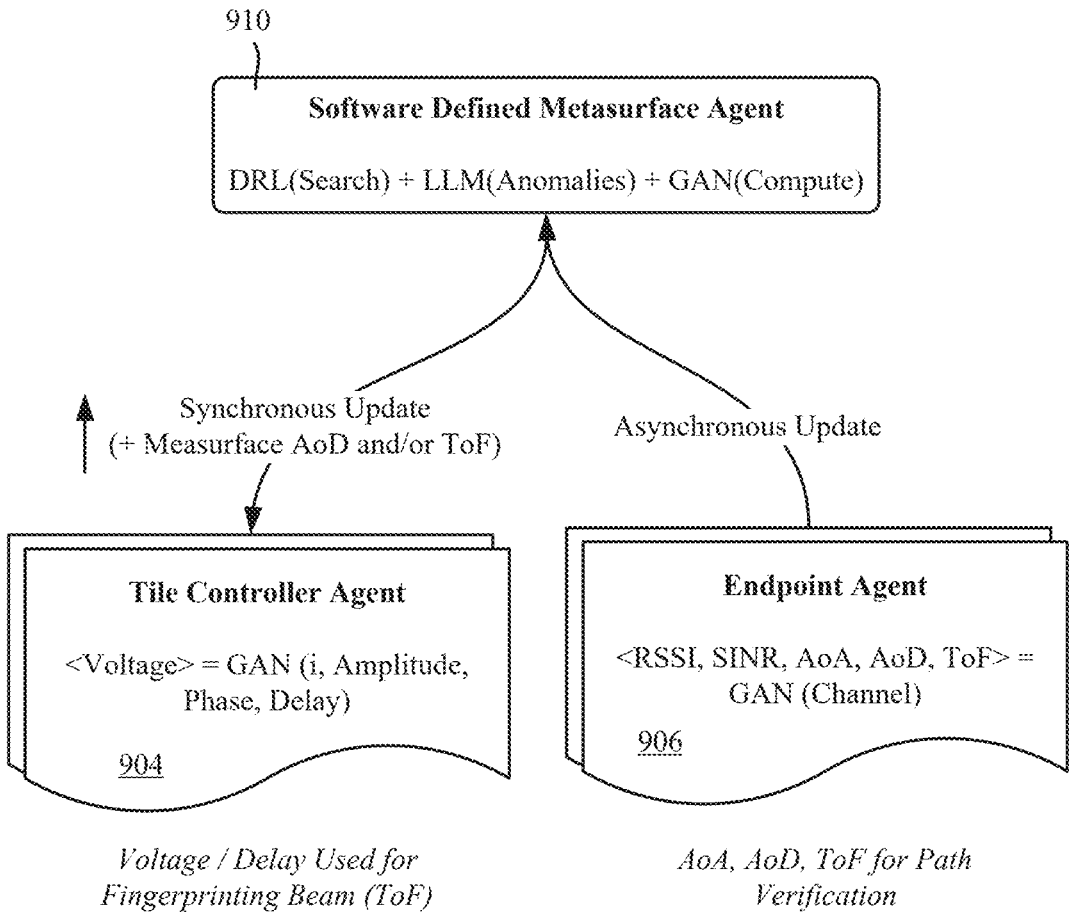
FIG. 9 is a representation of models within network equipment and a user equipment (endpoint agent) that can be used to detect an invalid communications path/the presence of an eavesdropper, in accordance with various example embodiments and implementations of the subject disclosure.

FIG. 9 shows one example implementation of various AI/ML models for inferencing that can be configured and implemented by the various legitimate entities for use in path integrity validation. In general, the tile controller (an agent 904) runs a generative adversarial network model having a discriminator trained to fingerprint beam data, and in particular, to compute a voltage or delay value based on amplitude, phase, and/or delay. These data are fed via (e.g., synchronous sampling) updates to a software defined metasurface agent 910, which is configured with multiple models.

An endpoint agent 906, e.g., running on the user equipment, also runs a generative adversarial network model based on channel characteristics for signals. Note that a generative adversarial network model is similar to traditional compute methods, but is mapped into very small footprint suitable for user equipment resources. In general, the endpoint agent's generative adversarial network model captures a vector <RSSI, SINR, AoA, AOD, ToF> (received signal strength information, signal-plus-interference-to-noise-ratio data, angle of arrival data, angle of departure data, and time of flight data) from the channel characteristics and sends the information via asynchronous updates to the software defined metasurface agent 910.

In general, the software defined metasurface agent 910 runs in a controller on the edge cloud or the like, and is therefore centralized from the perspective of base stations and/or tile controllers, which can have wired connections to the edge cloud. In one example implementation, the software defined metasurface agent 910 includes a deep information learning (DRL) model for path searching, although in this system the location of the reconfigurable intelligent surface is known. A large language model (LLM) is used for macrolevel anomaly detection. A generative adversarial network (GAN) uses the voltage data and the user equipment-provided vector data to evaluate the path integrity and/or signal strength data, notifying the tile controller if an anomaly is detected.

Figure 10:
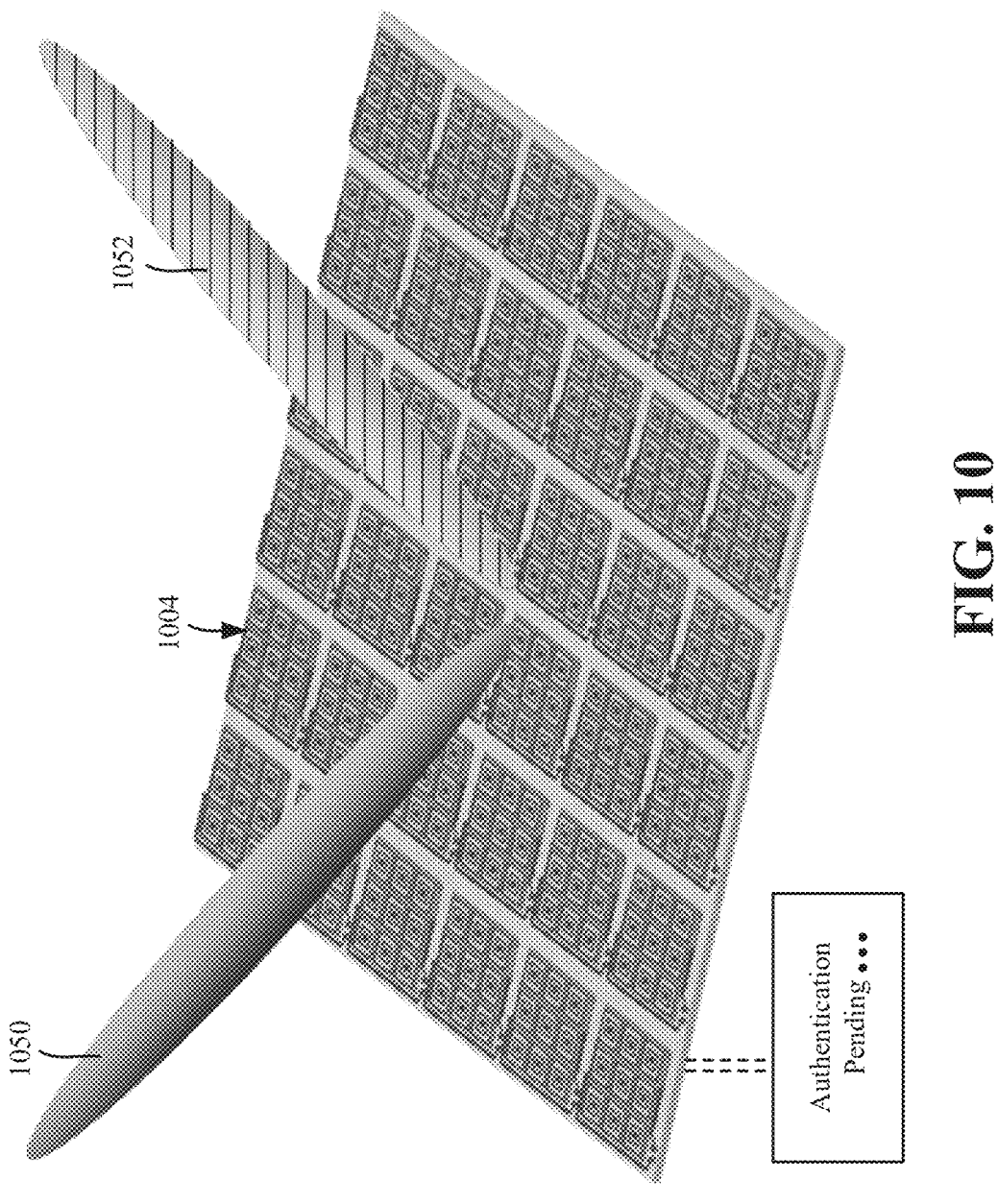
FIG. 10 is a three-dimensional perspective view representation of an example reconfigurable intelligent surface transmitting (reflecting) distorted electromagnetic signals while authentication of access to rights-managed data is pending, in accordance with various example embodiments and implementations of the subject disclosure.
Figure 11:
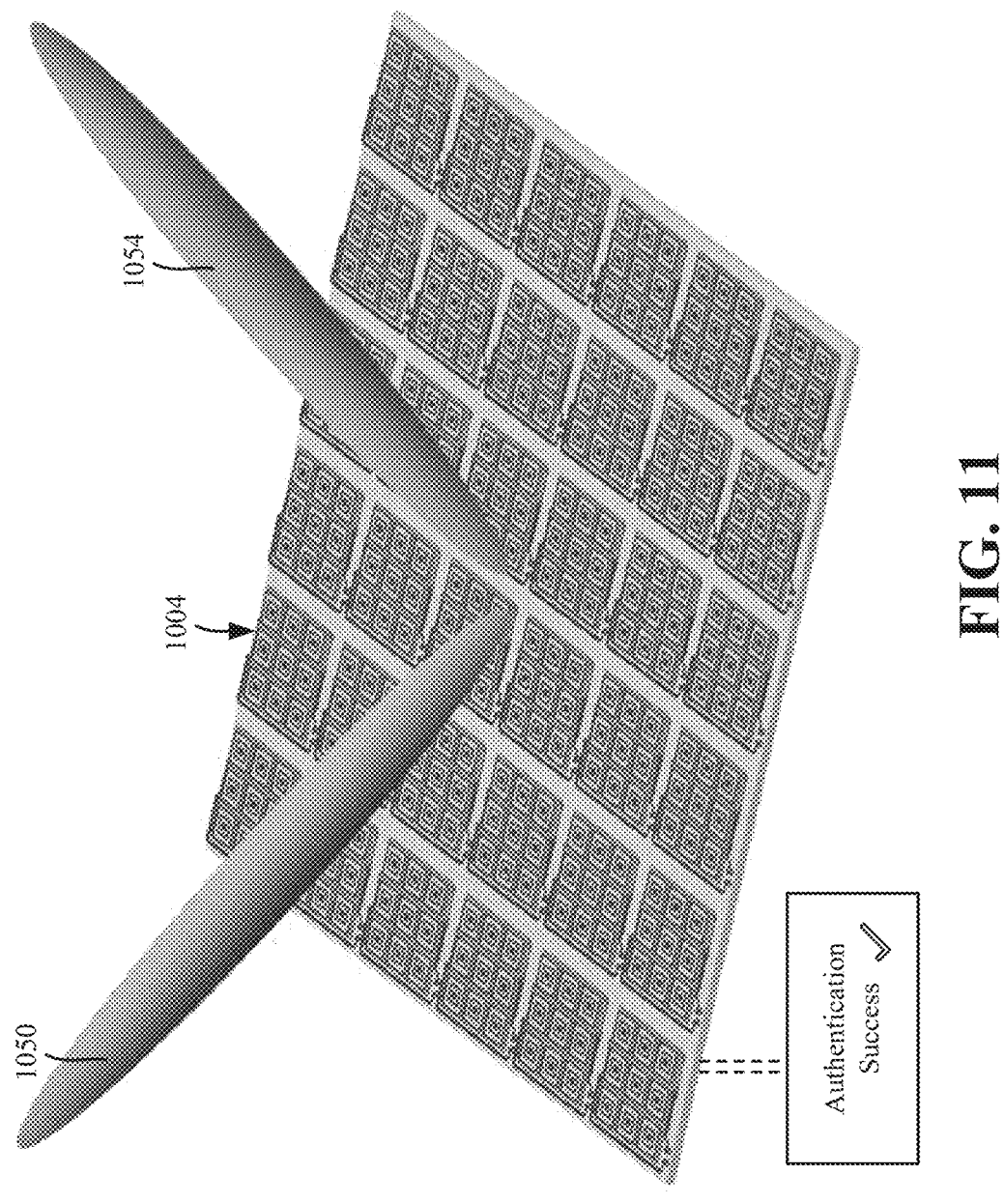
FIG. 11 is a three-dimensional perspective view representation of the example reconfigurable intelligent surface transmitting (reflecting) non-distorted electromagnetic signals once authentication of access to rights-managed data is successful (access is granted), in accordance with various example embodiments and implementations of the subject disclosure.
Figure 12:
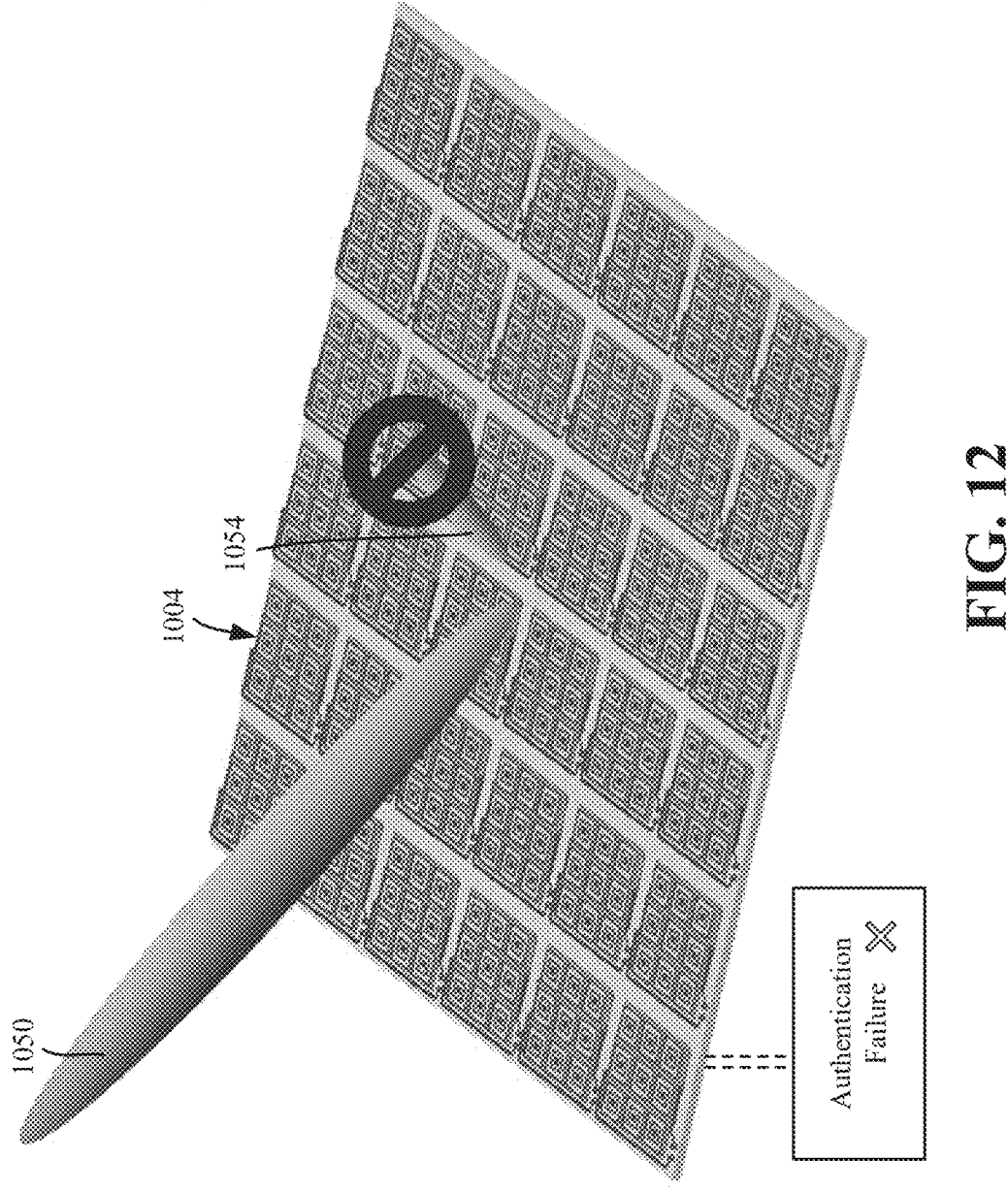
FIG. 12 is a three-dimensional perspective view representation of the example reconfigurable intelligent surface absorbing (not transmitting) electromagnetic signals once authentication of access to rights-managed data fails (access is denied), in accordance with various example embodiments and implementations of the subject disclosure.

FIGS. 10-12 summarize the concept of using a reconfigurable intelligent surface 1004 as part of rights management of rights-managed data. As depicted in FIG. 10, for incoming signals 1050, distorted signals 1052 are transmitted (reflected) by the reconfigurable intelligent surface 1004 while authentication is pending.

In FIG. 11, if an authorized user is authenticated, that is, an access request is granted, distortion is removed and the correct RF signals 1054 are transmitted by the reconfigurable intelligent surface 1004. In FIG. 12, if authentication fails/access is denied, the reconfigurable intelligent surface

1004 absorbs the signal by shorting to RF ground, such that any reflected energy 1054 is basically noise or weakly scattered rather than reflected. Note that while it is feasible to keep transmitting the distorted signal if authentication fails, absorbing the signal is even more secure as an unauthorized data access request results in no signal reflected back to the requester.

One or more concepts described herein can be embodied in a system, such as represented in the example operations of FIG. 13, and for example can include at least one memory that stores computer executable components and/or operations, and at least one processor that executes computer executable components and/or operations stored in the memory. Example operations can include operation 1302, which represents processing, via a tile controller coupled to a reconfigurable intelligent surface, incoming electromagnetic signals impinging on the reconfigurable intelligent surface. This can include example operations 1304-1312. Example operation 1304 represents determining that electromagnetic signals correspond to rights-managed data associated with identity and access credential data. Example operation 1306 represents communicating the identity and access credential data to an authentication system. Example operation 1308 represents during a pending authentication time, modifying the incoming electromagnetic signals to transmit electromagnetic signals, corresponding to the incoming electromagnetic signals, from the reconfigurable intelligent surface as distorted electromagnetic signals. Example operation 1310 represents in response to access being granted by the authentication system, ceasing the modifying of the incoming electromagnetic signals to transmit the electromagnetic signals, corresponding to the incoming electromagnetic signals, from the reconfigurable intelligent surface as non-distorted electromagnetic signals. Example operation 1312 represents in response to the access being denied by the authentication system, absorbing, by the reconfigurable intelligent surface, the incoming electromagnetic signals.

Modifying the incoming electromagnetic signals is performed using an output of a trained model coupled to the tile controller.

The access can be granted by the authentication system, and further e operations can include recording a transaction, representative of the access grant to the rights-managed data, in a remote blockchain network.

The authentication system can include a remote integrity and access management system.

The rights-managed data can include a base station event that can include performance metrics data; the access can be granted by the authentication system, and further operations can include logging the base station event.

The rights-managed data can correspond to stored tile controller data associated with the tile controller and a read request, the access can be granted by the authentication system, and further operations can include reading the tile controller data from a storage system in response to the read request.

The system of claim 1, wherein the rights-managed data can include tile controller data associated with the tile controller and a write request, the access can be granted by the authentication system, and further operations can include writing the tile controller data to a storage system in response to the write request.

The rights-managed data can correspond configuration data associated with the reconfigurable intelligent surface, and further operations can include applying the configuration data to change an operational state of the reconfigurable intelligent surface.

Further operations can include verifying that a signal path comprising a base station that originates the incoming electromagnetic signals, the reconfigurable intelligent surface, and a user equipment that receives transmitted electromagnetic signals from the reconfigurable intelligent surface, is valid based on at least one of: expected time of flight data representative of an expected time of flight of the incoming electromagnetic signals compared to actual time of flight data representative of an actual time of flight of the incoming electromagnetic signals, or expected angle of arrival data representative of an expected angle of arrival of the incoming electromagnetic signals compared to actual angle of arrival data representative of an actual angle of arrival of the incoming electromagnetic signals. The system can include a centralized metasurface controller coupled to the tile controller, and the verifying that the signal path can be performed by network equipment that is part of a generative adversarial network that is executed via the centralized metasurface controller. The network equipment of the generative adversarial network can be first network equipment of a first generative adversarial network, the tile controller can be coupled to second network equipment of a second generative adversarial network that is executed by the tile controller, and further operations can include determining beam fingerprint data representative of a beam fingerprint by the second network equipment of the second generative adversarial network based on at least one of: signal impedance, signal amplitude, signal phase or signal delay, and communicating the beam fingerprint data from the tile controller to the centralized metasurface controller for use in identification of the reconfigurable intelligent surface in the signal path.

Further operations can include verifying that a signal path comprising a user equipment that originates the incoming electromagnetic signals, the reconfigurable intelligent surface, and a base station that receives transmitted electromagnetic signals from the reconfigurable intelligent surface, is valid based on at least one of: expected time of flight data representative of an expected time of flight of the incoming electromagnetic signals compared to actual time of flight data representative of an actual time of flight of the incoming electromagnetic signals, or expected angle of arrival data representative of an expected angle of arrival of the incoming electromagnetic signals compared to actual angle of arrival data representative of an actual angle of arrival of the incoming electromagnetic signals. The system further can include a software defined metasurface controller; verifying that the signal path can be performed by a generative adversarial network that can be executed via the software defined metasurface controller.

Figure 14:
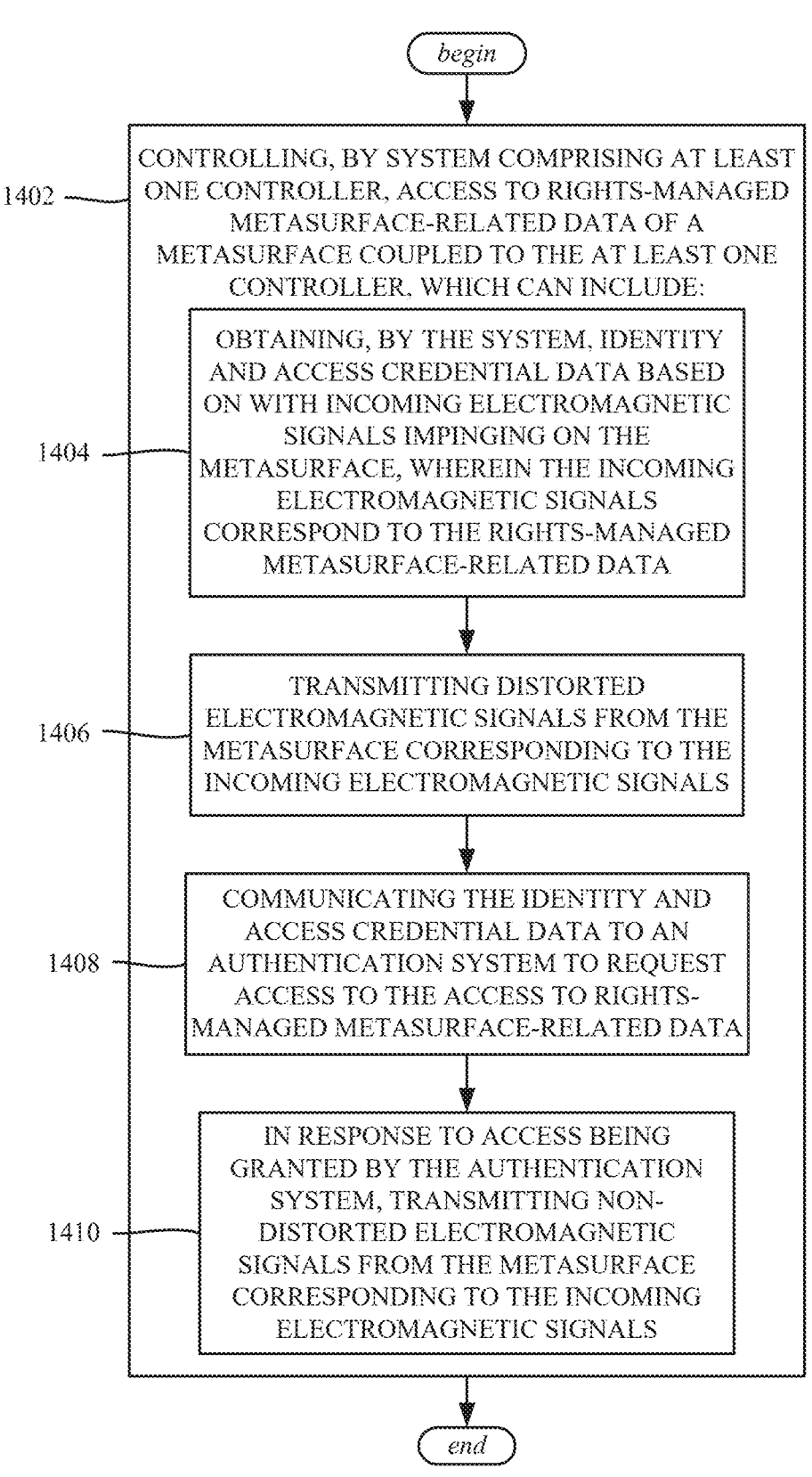
FIG. 14 is a flow diagram showing example operations related to transmitting distorted electromagnetic signals related to rights-managed data while access authentication is pending, and transmitting non-distorted electromagnetic signals if authentication is granted, in accordance with various example embodiments and implementations of the subject disclosure.

One or more example implementations and embodiments, such as corresponding to example operations of a method, are represented in FIG. 14. Example operation 1402 represents controlling, by system comprising at least one controller, access to rights-managed metasurface-related data of a metasurface coupled to the at least one controller. This can include example operations 1404-1412. Example operation 1404 represents obtaining, by the system, identity and access credential data based on with incoming electromagnetic signals impinging on the metasurface; the incoming electromagnetic signals can correspond to the rights-managed metasurface-related data. Example operation 1406 represents transmitting distorted electromagnetic signals from the metasurface corresponding to the incoming electromagnetic signals. Example operation 1408 represents communicating the identity and access credential data to an authentication system to request access to the access to rights-managed metasurface-related data. Example operation 1410 represents, in response to access being granted by the authentication system, transmitting non-distorted electromagnetic signals from the metasurface corresponding to the incoming electromagnetic signals.

Controlling the access to the rights-managed metasurface-related data further can include, in response to the access being denied by the authentication system, absorbing, by the metasurface, the incoming electromagnetic signals.

Further operations can include validating, by the system, a signal path via which the incoming electromagnetic signals are received and via which the non-distorted electromagnetic signals are transmitted; the signal path can include a base station, the metasurface, and a user equipment.

Further operations can include communicating, by the system, a transaction, representative of the access to the rights-managed metasurface-related data being granted, to a blockchain network for recordation of the transaction.

Figure 15:
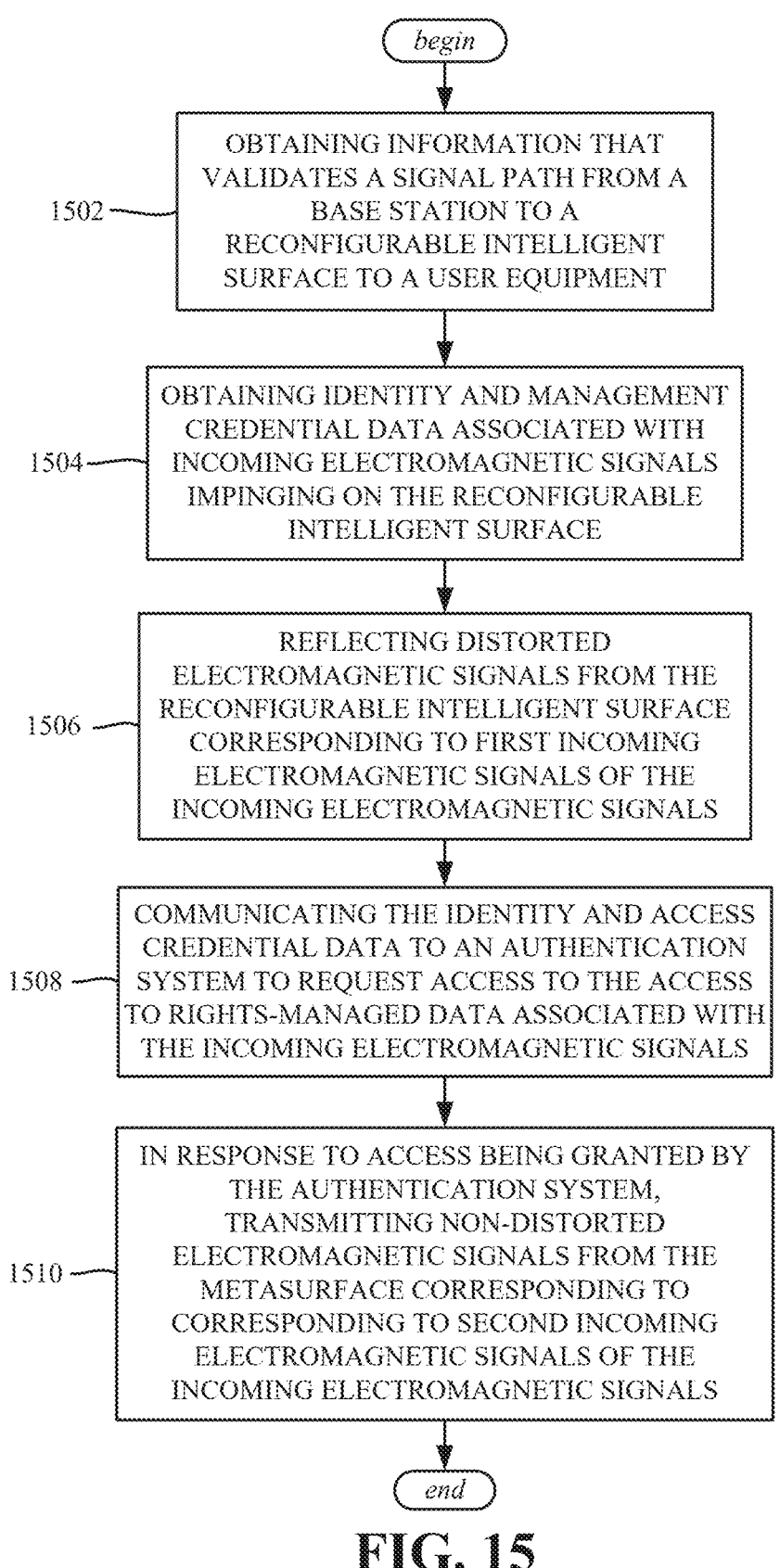
FIG. 15 is a flow diagram showing example operations related to obtaining credential data from incoming electromagnetic signals, transmitting distorted electromagnetic signals while authentication of the credential data is pending, and transmitting non-distorted electromagnetic signals in response to authentication being granted, in accordance with various example embodiments and implementations of the subject disclosure, in accordance with various example embodiments and implementations of the subject disclosure.

FIG. 15 summarizes various example operations, e.g., corresponding to a machine-readable medium, comprising executable instructions that, when executed by at least one processor of network equipment, facilitate performance of operations. Example operation 1502 represents obtaining information that validates a signal path from a base station to a reconfigurable intelligent surface to a user equipment. Example operation 1504 represents obtaining identity and management credential data associated with incoming electromagnetic signals impinging on the reconfigurable intelligent surface. Example operation 1506 represents reflecting distorted electromagnetic signals from the reconfigurable intelligent surface corresponding to first incoming electromagnetic signals of the incoming electromagnetic signals. Example operation 1508 represents communicating the identity and access credential data to an authentication system to request access to the access to rights-managed data associated with the incoming electromagnetic signals. Example operation 1510 represents in response to access being granted by the authentication system, transmitting non-distorted electromagnetic signals from the metasurface corresponding to corresponding to second incoming electromagnetic signals of the incoming electromagnetic signals.

Further operations can include, in response to the access being denied by the authentication system, absorbing, by the reconfigurable intelligent surface, the second incoming electromagnetic signals.

Further operations can include communicating a transaction, representative of the access to the rights-managed metasurface-related data being granted, to a blockchain network for recording of the transaction.

As can be seen, the technology described herein facilitates rights management of data and information in a metasurface system, including an AI-based system. This ensures data accuracy and control with respect to metasurfaces, including metasurface systems integrated with AI to achieve adaptive millimeter-wave (or even higher frequencies) control. Such real-time data management and integrity assurance for AI-driven metasurfaces can ensure the accuracy, reliability, and security of the data and information that is to be processed.

In one example implementation, a decentralized block chain network is leveraged to avoid any single point of failure, and to provide smart-contract for programmable access control. An identity and access management system is leveraged for improved data security and authentication, reducing attack exposure.

The technology described herein facilitates storing of captured event data (e.g., SINR, RSSI) for various uses, e.g., the event data can be automatically annotated, utilized for capacity planning, predictive maintenance, motion tracking, system optimization, and root cause analysis in real-time, leveraging AI. Data collection (e.g., periodically collected) from the tile controllers can help identify malfunctioning tiles, track degradation, develop new beamforming algorithms, and/or generate synthetic data for testing and to optimize tile power allocation by analyzing energy consumption.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   at least one processor; and
   at least one memory that stores executable instructions that, when executed by the at least one processor, facilitate performance of operations, the operations comprising:
   processing, via a tile controller coupled to a reconfigurable intelligent surface, incoming electromagnetic signals impinging on the reconfigurable intelligent surface, comprising:
   determining that electromagnetic signals correspond to rights-managed data associated with identity and access credential data;
   communicating the identity and access credential data to an authentication system;
   during a pending authentication time, modifying the incoming electromagnetic signals to transmit electromagnetic signals, corresponding to the incoming electromagnetic signals, from the reconfigurable intelligent surface as distorted electromagnetic signals;
   in response to access being granted by the authentication system, ceasing the modifying of the incoming electromagnetic signals to transmit the electromagnetic signals, corresponding to the incoming electromagnetic signals, from the reconfigurable intelligent surface as non-distorted electromagnetic signals; and
   in response to the access being denied by the authentication system, absorbing, by the reconfigurable intelligent surface, the incoming electromagnetic signals.

2. The system of claim 1, wherein the modifying of the incoming electromagnetic signals is performed using an output of a trained model coupled to the tile controller.

3. The system of claim 1, wherein the access is granted by the authentication system, and wherein the operations further comprise recording a transaction, representative of the access grant to the rights-managed data, in a remote blockchain network.

4. The system of claim 1, wherein the authentication system comprises a remote integrity and access management system.

5. The system of claim 1, wherein the rights-managed data comprises a base station event comprising performance metrics data, wherein the access is granted by the authentication system, and wherein the operations further comprise logging the base station event.

6. The system of claim 1, wherein the rights-managed data corresponds to stored tile controller data associated with the tile controller and a read request, wherein the access is granted by the authentication system, and wherein the operations further comprise reading the tile controller data from a storage system in response to the read request.

7. The system of claim 1, wherein the rights-managed data comprises tile controller data associated with the tile controller and a write request, wherein the access is granted by the authentication system, and wherein the operations further comprise writing the tile controller data to a storage system in response to the write request.

8. The system of claim 1, wherein the rights-managed data corresponds to configuration data associated with the reconfigurable intelligent surface, and wherein the operations further comprise applying the configuration data to change an operational state of the reconfigurable intelligent surface.

9. The system of claim 1, wherein the operations further comprise verifying that a signal path comprising a base station that originates the incoming electromagnetic signals, the reconfigurable intelligent surface, and a user equipment that receives transmitted electromagnetic signals from the reconfigurable intelligent surface, is valid based on at least one of: expected time of flight data representative of an expected time of flight of the incoming electromagnetic signals compared to actual time of flight data representative of an actual time of flight of the incoming electromagnetic signals, or expected angle of arrival data representative of an expected angle of arrival of the incoming electromagnetic signals compared to actual angle of arrival data representative of an actual angle of arrival of the incoming electromagnetic signals.

10. The system of claim 9, wherein the system comprises a centralized metasurface controller coupled to the tile controller, and wherein the verifying that the signal path is performed by network equipment that is part of a generative adversarial network that is executed via the centralized metasurface controller.

11. The system of claim 10, wherein the network equipment of the generative adversarial network is first network equipment of a first generative adversarial network, wherein the tile controller is coupled to second network equipment of a second generative adversarial network that is executed by the tile controller, and wherein the operations further comprise determining beam fingerprint data representative of a beam fingerprint by the second network equipment of the second generative adversarial network based on at least one of: signal impedance, signal amplitude, signal phase or signal delay, and communicating the beam fingerprint data from the tile controller to the centralized metasurface controller for use in identification of the reconfigurable intelligent surface in the signal path.

12. The system of claim 1, wherein the operations further comprise verifying that a signal path comprising a user equipment that originates the incoming electromagnetic signals, the reconfigurable intelligent surface, and a base station that receives transmitted electromagnetic signals from the reconfigurable intelligent surface, is valid based on at least one of: expected time of flight data representative of an expected time of flight of the incoming electromagnetic signals compared to actual time of flight data representative of an actual time of flight of the incoming electromagnetic signals, or expected angle of arrival data representative of an expected angle of arrival of the incoming electromagnetic signals compared to actual angle of arrival data representative of an actual angle of arrival of the incoming electromagnetic signals.

13. The system of claim 12, wherein the system further comprises a software defined metasurface controller, and wherein the verifying that the signal path is performed by a generative adversarial network that is executed via the software defined metasurface controller.

14. A method, comprising:
   controlling, by system comprising at least one controller, access to rights-managed metasurface-related data of a metasurface coupled to the at least one controller, the controlling comprising:

obtaining, by the system, identity and access credential data based on with incoming electromagnetic signals impinging on the metasurface, wherein the incoming electromagnetic signals correspond to the rights-managed metasurface-related data;

transmitting distorted electromagnetic signals from the metasurface corresponding to the incoming electromagnetic signals;

communicating the identity and access credential data to an authentication system to request access to the access to rights-managed metasurface-related data; and in response to access being granted by the authentication system, transmitting non-distorted electromagnetic signals from the metasurface corresponding to the incoming electromagnetic signals.

15. The method of claim 14, wherein the controlling of the access to the rights-managed metasurface-related data further comprises, in response to the access being denied by the authentication system, absorbing, by the metasurface, the incoming electromagnetic signals.

16. The method of claim 14, further comprising validating, by the system, a signal path via which the incoming electromagnetic signals are received and via which the non-distorted electromagnetic signals are transmitted, wherein the signal path comprises a base station, the metasurface, and a user equipment.

17. The method of claim 14, further comprising communicating, by the system, a transaction, representative of the access to the rights-managed metasurface-related data being granted, to a blockchain network for recordation of the transaction.

18. A non-transitory machine-readable medium, comprising executable instructions that, when executed by at least one processor of system, facilitate performance of operations, the operations comprising:

obtaining information that validates a signal path from a base station to a reconfigurable intelligent surface to a user equipment;

obtaining identity and management credential data associated with incoming electromagnetic signals impinging on the reconfigurable intelligent surface;

reflecting distorted electromagnetic signals from the reconfigurable intelligent surface corresponding to first incoming electromagnetic signals of the incoming electromagnetic signals;

communicating the identity and access credential data to an authentication system to request access to the access to rights-managed data associated with the incoming electromagnetic signals; and in response to access being granted by the authentication system, transmitting non-distorted electromagnetic signals from the metasurface corresponding to corresponding to second incoming electromagnetic signals of the incoming electromagnetic signals.

19. The non-transitory machine-readable medium of claim 18, wherein the operations further comprise, in response to the access being denied by the authentication system, absorbing, by the reconfigurable intelligent surface, the second incoming electromagnetic signals.

20. The non-transitory machine-readable medium of claim 18, wherein the operations further comprise communicating a transaction, representative of the access to the rights-managed metasurface-related data being granted, to a blockchain network for recording of the transaction.

* * * * *